United States Patent [19]

Tibbles

[11] Patent Number: 5,417,621

[45] Date of Patent: May 23, 1995

[54] DRIVEAWAY LOCKUP STRATEGY FOR AN INFINITELY VARIABLE TRANMISSION WITH A HYDROKINETIC TORQUE CONVERTER

[75] Inventor: Thomas T. Tibbles, Livonia, Mich.

[73] Assignee: Ford Motor Company, Dearborn, Mich.

[21] Appl. No.: 172,335

[22] Filed: Dec. 22, 1993

[51] Int. Cl.$^6$ .................. B60K 41/14; F16D 43/286
[52] U.S. Cl. ........................ 477/39; 477/49
[58] Field of Search .............. 477/38, 39, 43, 48, 477/49, 70

[56] References Cited

U.S. PATENT DOCUMENTS

| | | | |
|---|---|---|---|
| 4,583,423 | 4/1986 | Hahne | 74/689 |
| 4,665,773 | 5/1987 | Hiramatsu et al. | 477/49 X |
| 4,823,925 | 4/1989 | Okhumo et al. | 477/39 |
| 4,876,920 | 10/1989 | Eichenberger | 74/689 |
| 5,160,003 | 11/1992 | Suzuki | 477/39 X |
| 5,170,868 | 12/1992 | Yamashita et al. | 477/39 |

FOREIGN PATENT DOCUMENTS

| | | | |
|---|---|---|---|
| 326274 | 8/1989 | European Pat. Off. | 477/39 |
| 9208256 | 11/1984 | Japan | 477/48 |
| 2008842 | 1/1987 | Japan | 477/70 |
| 3043827 | 2/1988 | Japan | 477/48 |
| 3263139 | 10/1988 | Japan | 477/48 |
| 3292448 | 12/1991 | Japan | 477/48 |

Primary Examiner—Charles A. Marmor
Assistant Examiner—Nathan O. Jensen
Attorney, Agent, or Firm—Roger L. May; Frank G. McKenzie

[57] ABSTRACT

A control system for a friction bypass clutch for a torque converter that forms a part of an infinitely variable transmission in a vehicle driveline having an internal combustion engine including closed loop electronic controllers for coordinated control of the speed ratio of the transmission and the rate of engagement of the torque converter bypass clutch so that the resulting turbine speed will cause the vehicle engine to operate at an ideal speed and throttle setting that will achieve maximum brake specific fuel consumption wherein the time required for reaching the ideal speed is longer than the time required to complete engagement of the bypass clutch, thus effecting smooth clutch engagement with reduced energy absorption.

7 Claims, 22 Drawing Sheets

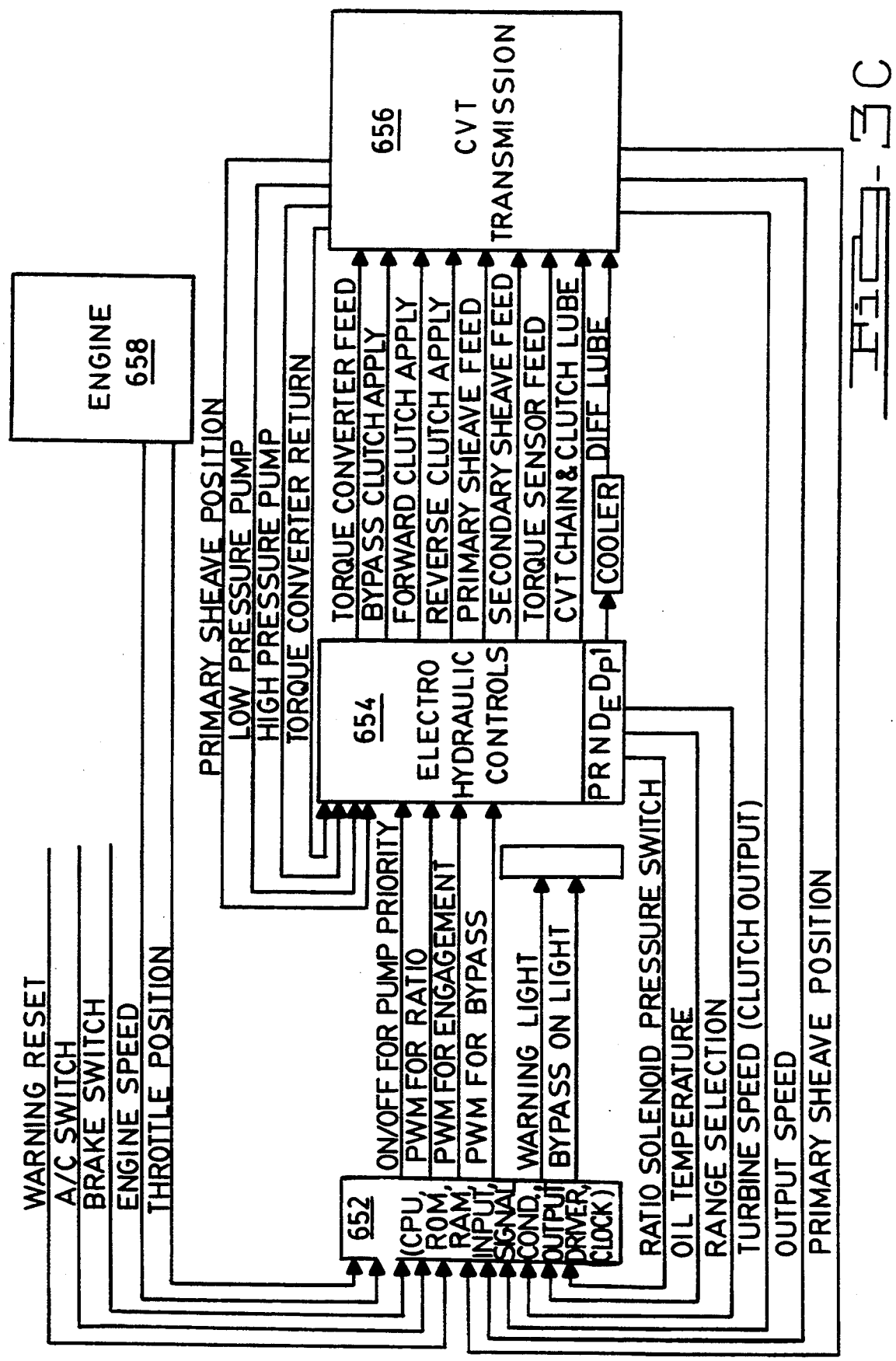

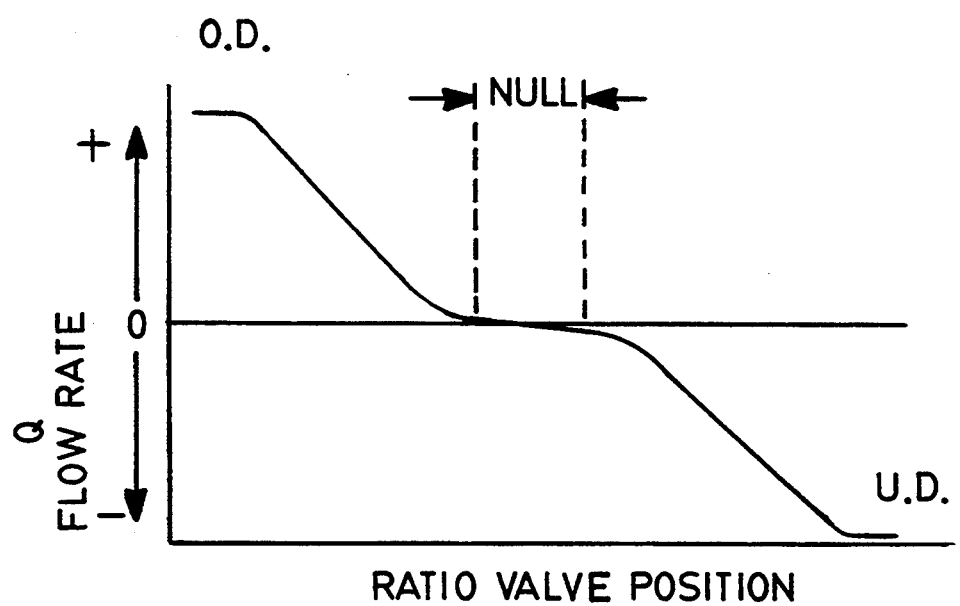
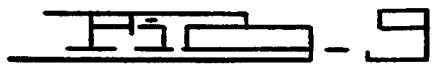

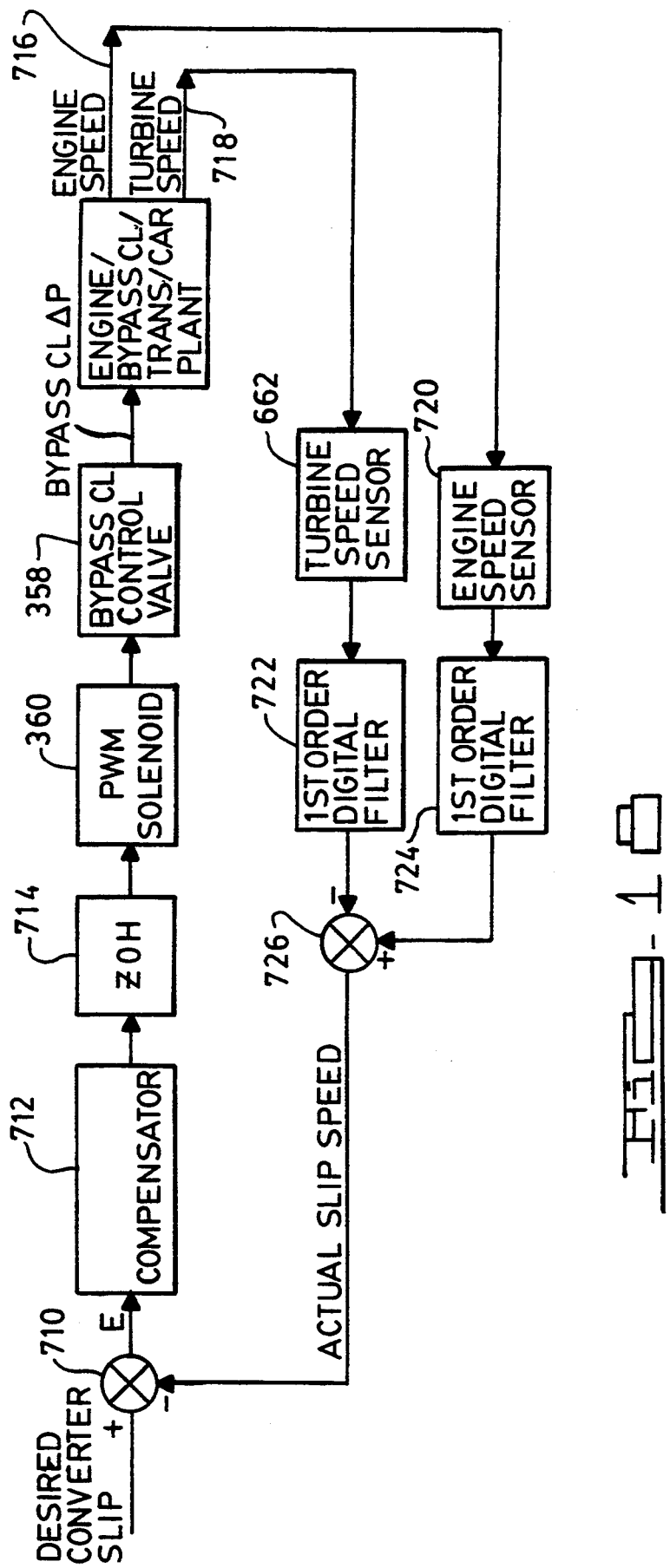

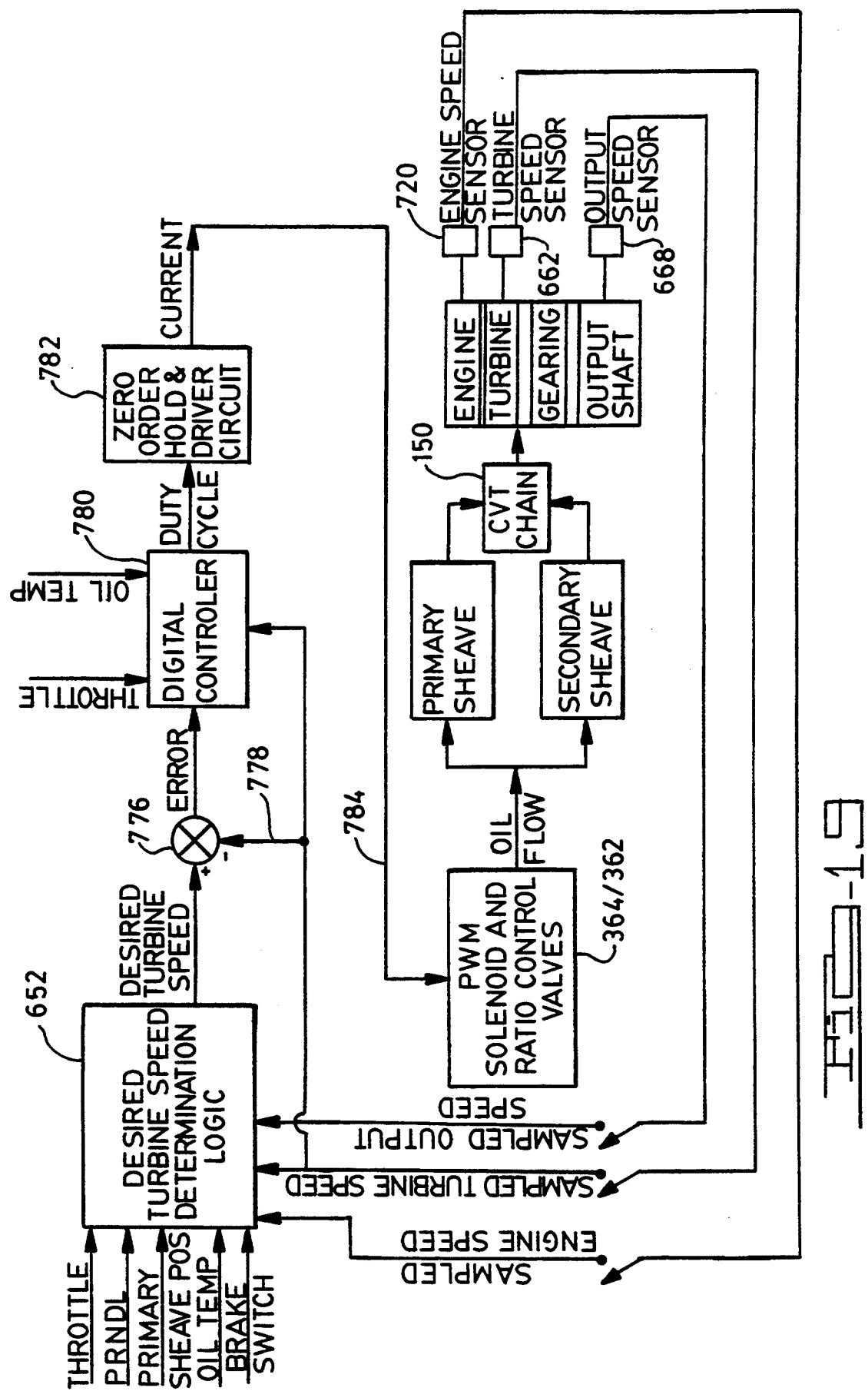

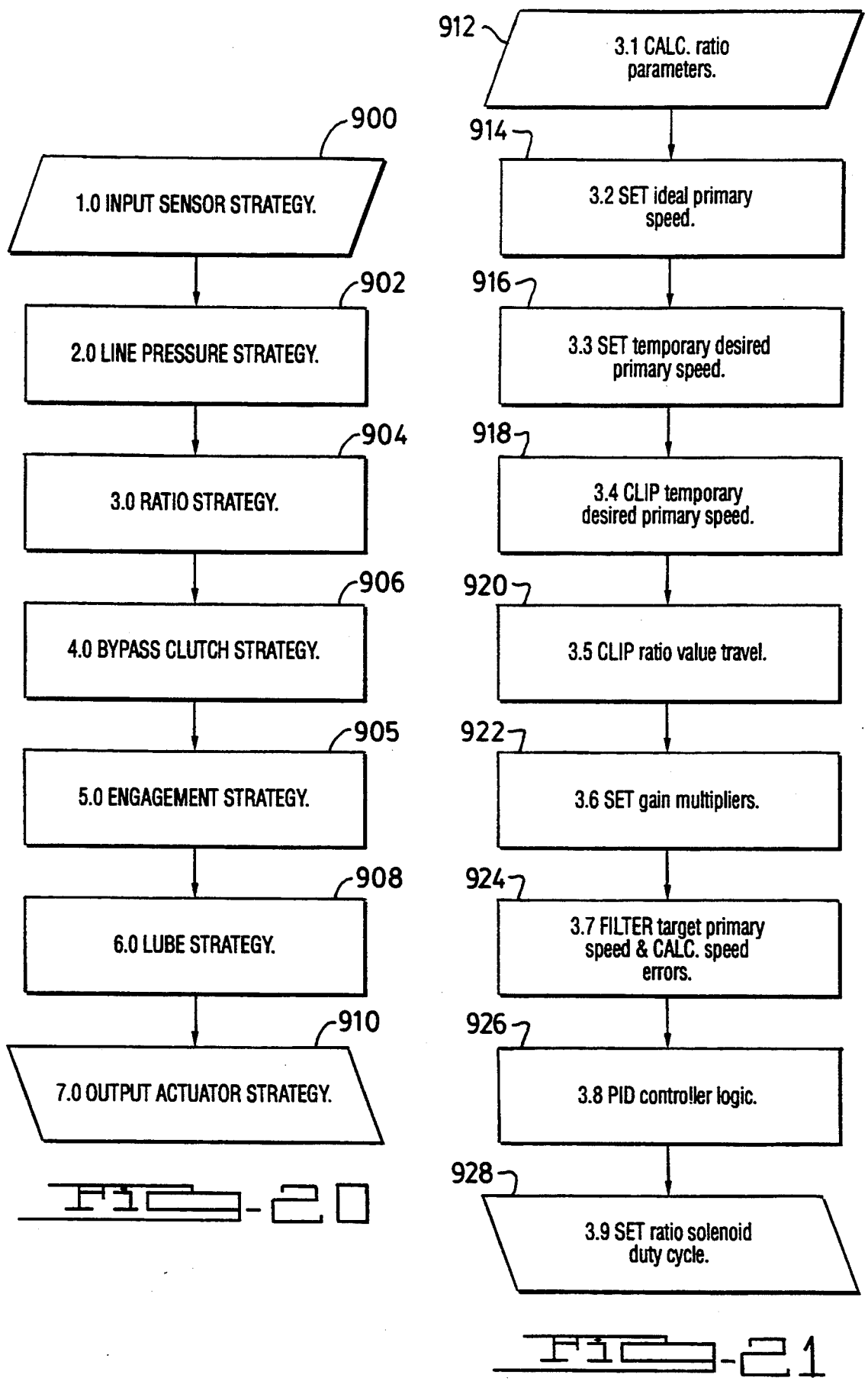

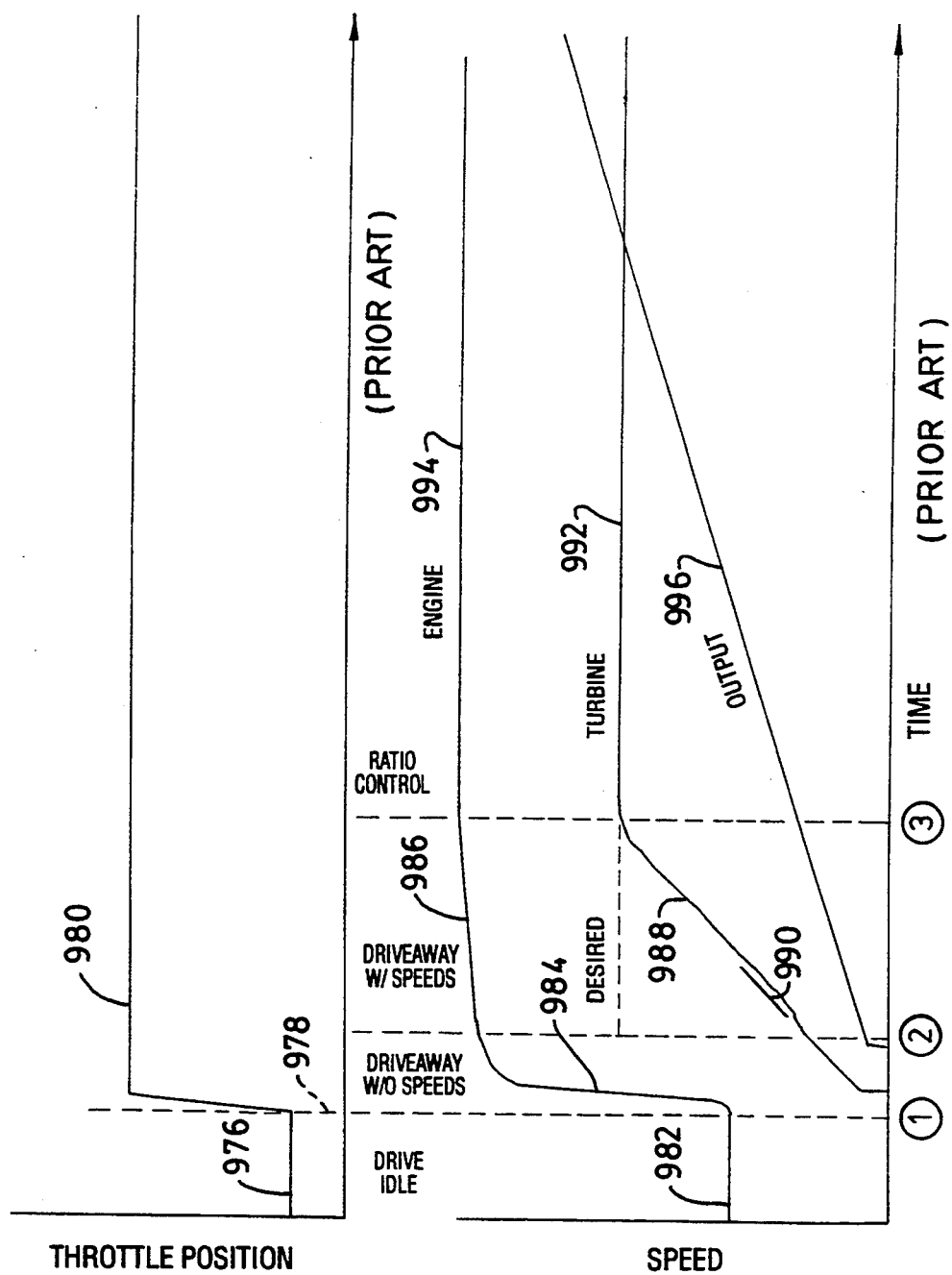

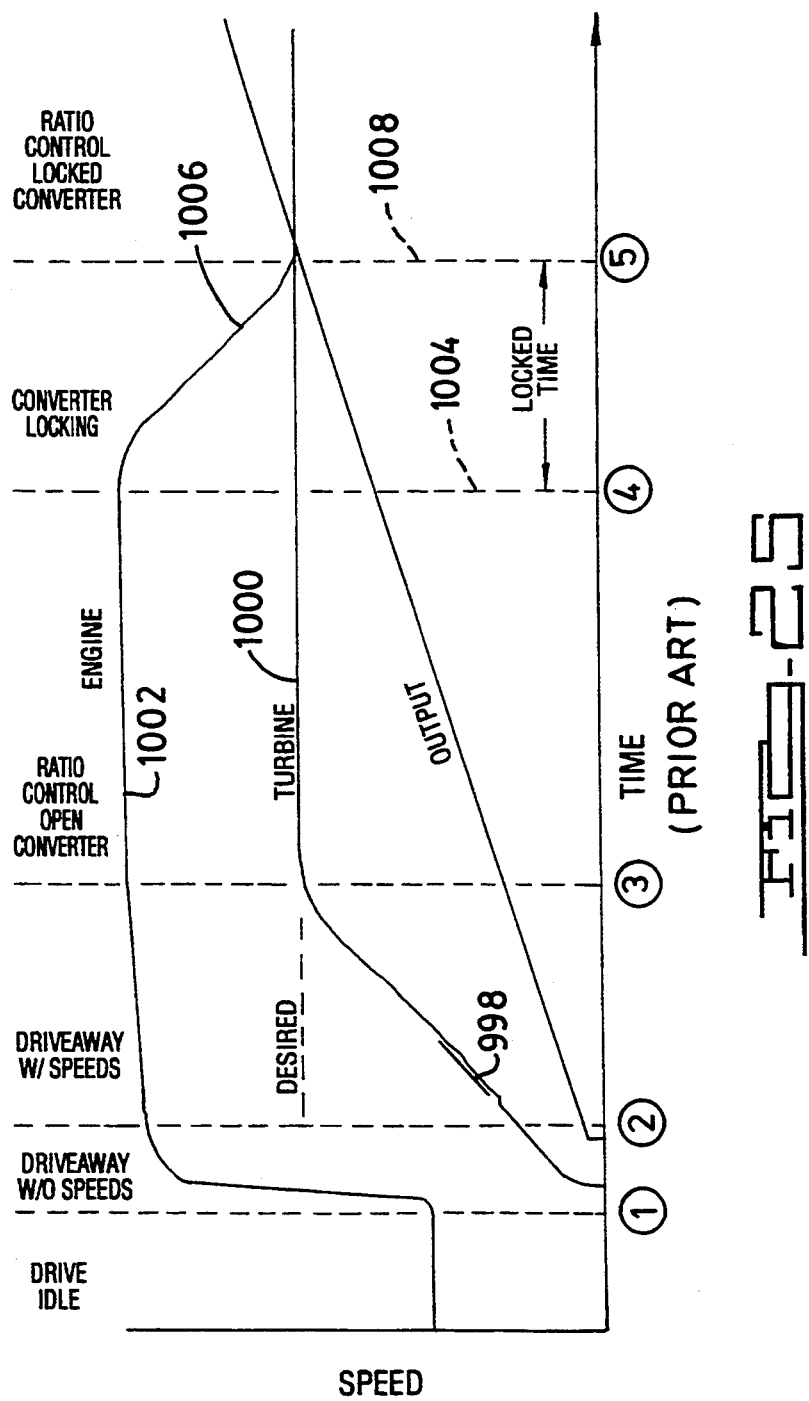

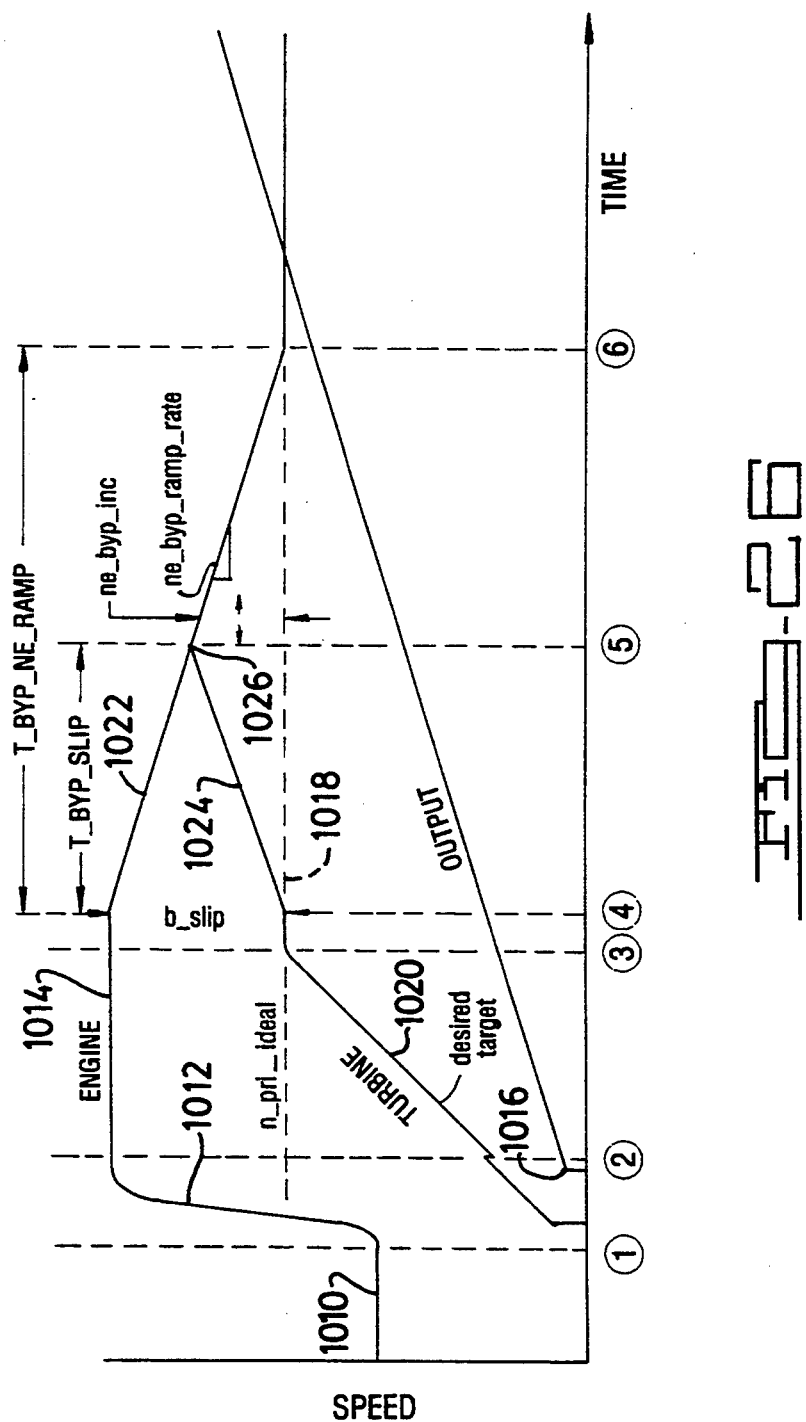

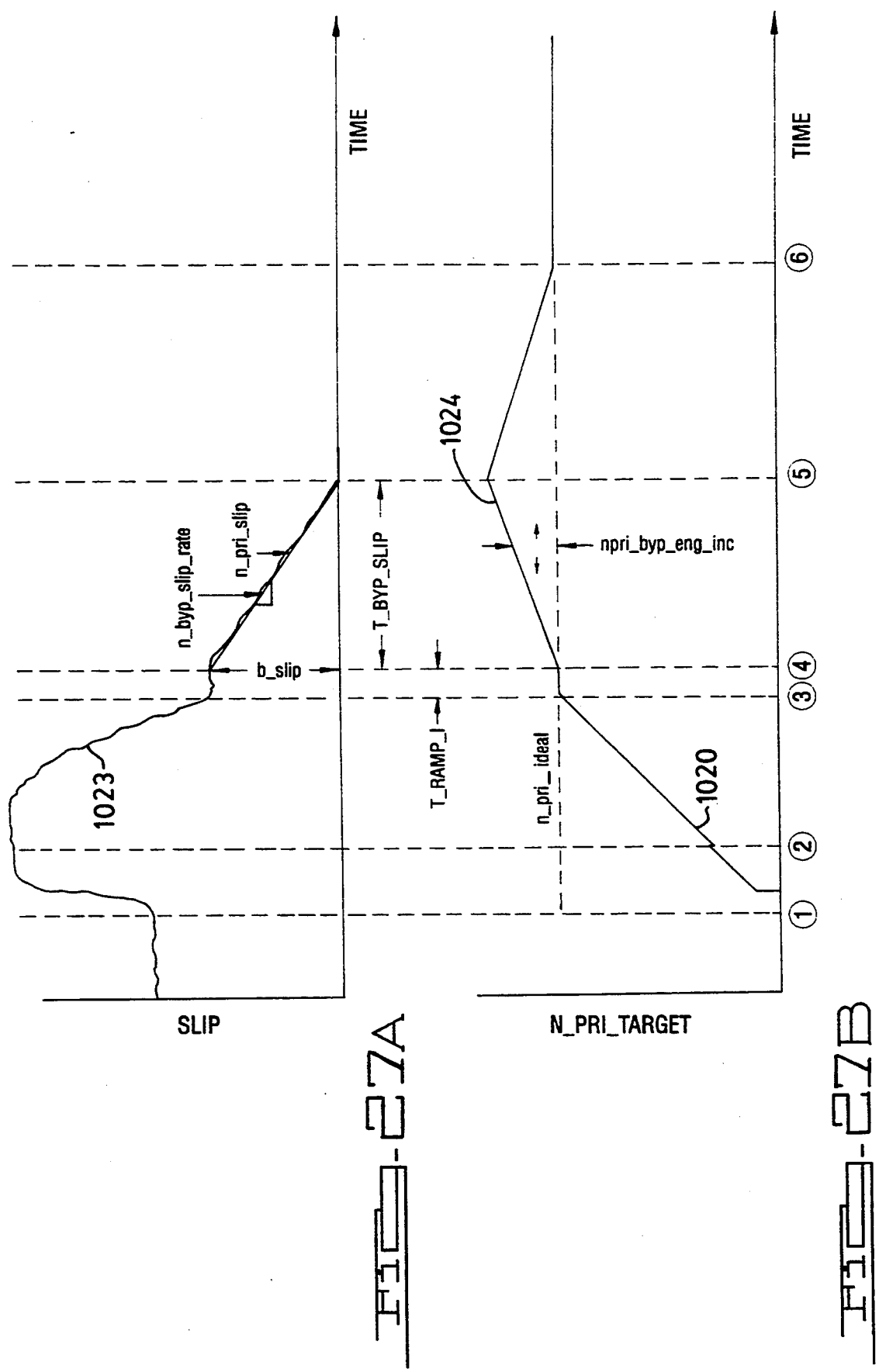

DRIVEAWAY LOCKUP STRATEGY FOR AN INFINITELY VARIABLE TRANMISSION WITH A HYDROKINETIC TORQUE CONVERTER

TECHNICAL FIELD

The invention relates to automotive vehicle power transmission mechanisms having infinitely variable ratio characteristics and having a hydrokinetic torque converter with a lockup friction clutch.

BACKGROUND OF THE INVENTION

My invention comprises improvements in a continuously variable transmission for automotive vehicles having a throttle-controlled internal combustion engine. It is for use with infinitely variable transmissions having a hydrokinetic torque converter between the engine and the torque input elements of the infinitely variable ratio torque transfer members.

Examples of infinitely variable transmissions capable of incorporating the improvements of the invention are the infinitely variable transmissions shown in U.S. Pat. Nos. 4,876,920 and 4,583,423.

Infinitely variable transmissions such as those disclosed in the references mentioned above are capable of allowing the engine and the transmission to transfer torque from the engine to the traction wheels of the vehicle with a continuously variable ratio such that the engine will operate at a target speed that will achieve its most efficient specific fuel consumption. Improved fuel efficiency can be achieved throughout the entire range of vehicle speed by allowing the converter turbine speed to be controlled to a target value that will cause the engine speed to operate at a value for any given engine throttle setting that will achieve the minimum brake specific fuel consumption.

Copending U.S. patent application Ser. No. 028,019, filed Mar. 8, 1993, entitled "Continuously Variable Transmission" discloses a control system for making control adjustments that will allow the engine speed to increase upon advancement of the engine throttle in such a way that driveability is improved. The engine speed changes in a manner that is consistent with an increasing vehicle speed as torque demand increases. That copending application is assigned to the assignee of my present invention.

If the torque converter used with the infinitely variable transmission includes a lockup clutch, the turbine speed during engagement of the lockup clutch will force changes in engine speed. If the transmission is calibrated properly, the engine speed then will achieve a target value that will correspond to the speed consistent with minimum brake specific fuel consumption at the particular throttle setting that is commanded by the vehicle operator. If the clutch is engaged rapidly, the change in engine speed will result in a lack of smoothness and a noticeable shift sensation during the time the lockup clutch is increasing in torque transmitting capacity. This makes necessary a balancing of the driveline smoothness considerations with fuel economy considerations.

The improvement of the present invention is adaptable to an infinitely variable transmission that is controlled by a microprocessor with closed loop control of the speed ratio and torque converter slip. When the torque converter clutch is locked up, turbine speed is the same as the engine speed. By appropriately calibrating the rate of engagement of the clutch and the change in speed ratio during the time that the engine speed is decreasing, it is possible to achieve an unperceived decrease of the engine speed with a minimum energy absorption by the clutch. This is done with a coordinated speed ratio control strategy and converter clutch control strategy. The time of engagement required by the torque converter clutch is significantly lower than the total time required to decrease engine speed to the desired or optimum engine speed for an engine throttle setting where minimum fuel consumption is achieved.

My present invention includes a control strategy and a control system for implementing that strategy so that an early lockup of the torque converter clutch is achieved.

BRIEF DESCRIPTION OF THE DRAWINGS

FIG. 3C is a schematic overview of the transmission, the electrohydraulic controls, and the microprocessor for carrying out the control strategy;

FIG. 9 is a plot of the flow rate for the ratio control servo for various positions of the ratio control valve of the control system of FIGS. 3A and 3B;

FIG. 18 is a diagram of a closed loop circuit for the bypass clutch controller;

FIG. 19 is a diagram of the turbine speed controller closed loop;

FIG. 20 is a flow chart showing the sequence and the execution of the control modules for the microprocessor of FIG. 3C, two of the modules being pertinent to the improvement of the present invention;

FIG. 21 is a flow chart showing the steps in the strategy during the execution of the ratio strategy module of FIG. 20;

FIG. 24A is a plot of the throttle position versus time during a driveaway mode with an open torque converter;

FIG. 24B is a plot of the speed versus time for the mode indicated in FIG. 24A when the transmission has an open converter;

FIG. 25 shows speed versus time for a driveaway mode with a conventional lockup clutch in the converter;

FIG. 26 shows the same characteristics illustrated in FIG. 25, but with a torque converter lockup schedule that incorporates the improvements of my invention; and FIGS. 27A and 27B show the slip of the torque converter and the desired turbine speed, respectively, plotted against time during the lockup converter clutch engagement interval.

PARTICULAR DESCRIPTION OF THE INVENTION

For the purpose of describing an infinitely variable transmission in an automotive vehicle driveline wherein the improvements of my invention can be realized, I will describe generally a torque converter transmission with an adjustable sheave and chain assembly as set forth in copending patent application Ser. No. 028,019 identified above. Reference may be made to that copending application, which is hereby incorporated by reference, for a complete understanding of the operation of the control system.

Figure 1:
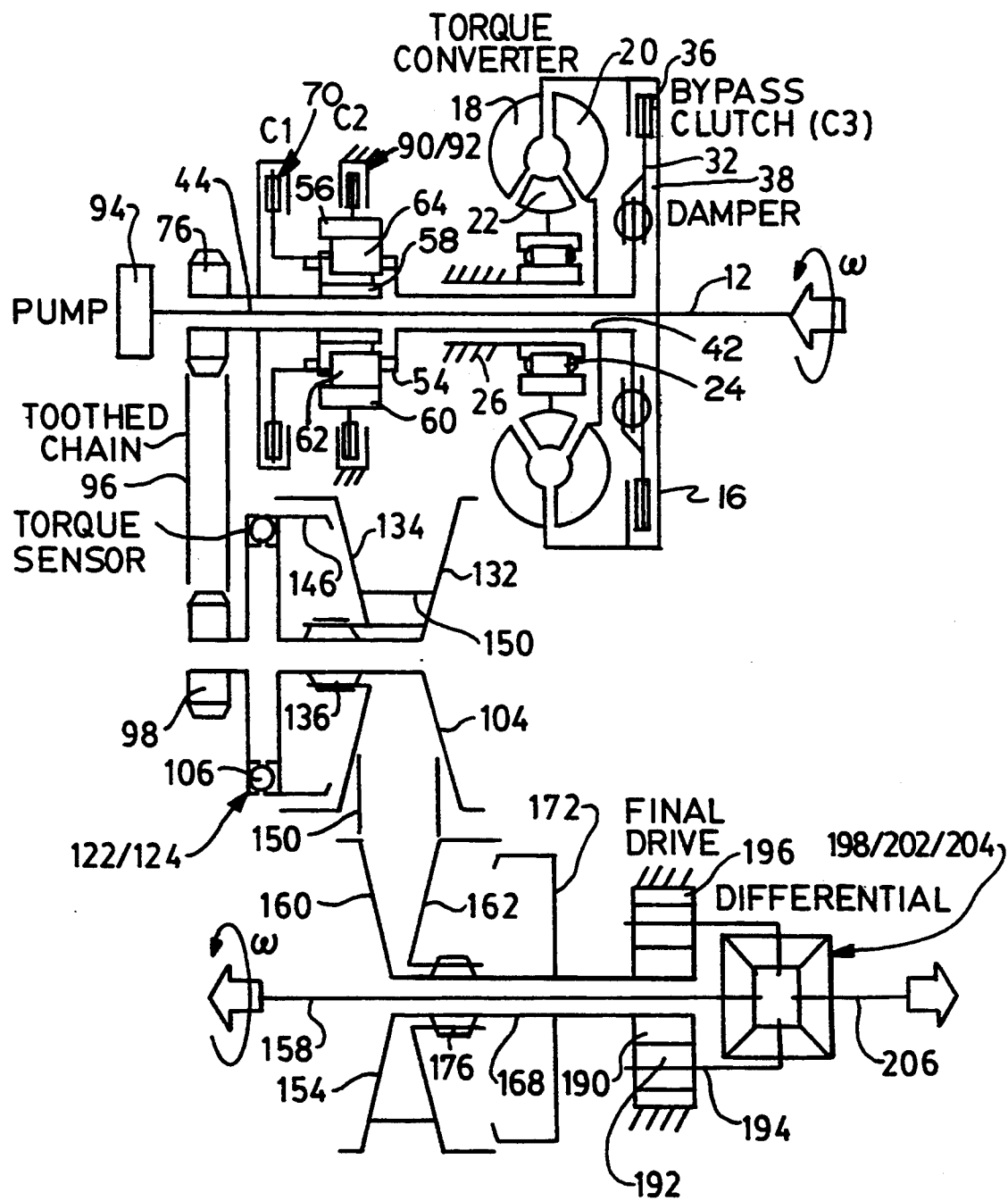
FIG. 1 is a schematic representation of an infinitely variable belt drive for an automotive vehicle having an internal combustion engine wherein the drive consists of a torque converter and adjustable ratio drive pulleys with a cooperating drive chain.
Figure 2:
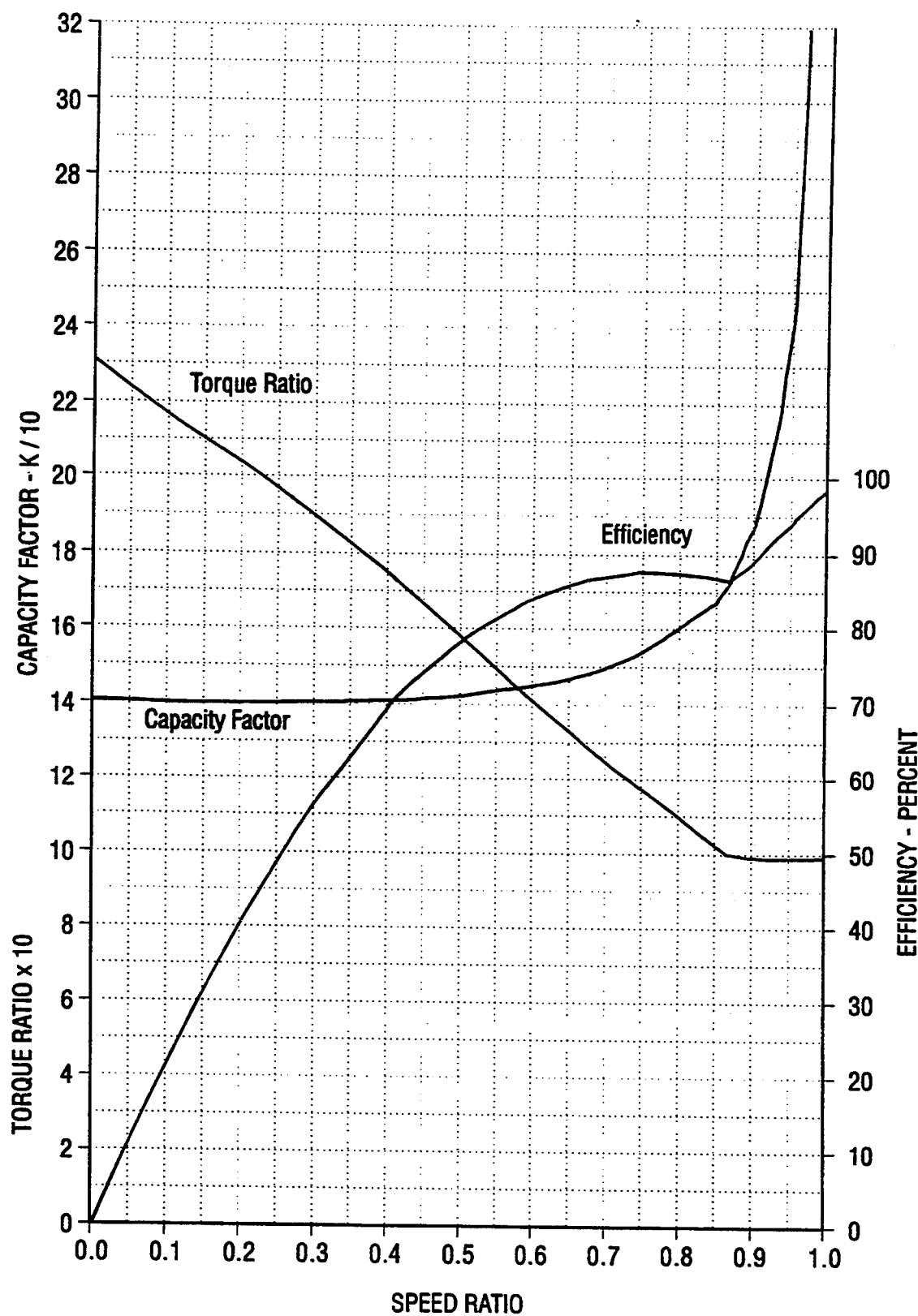
FIG. 2 is a typical torque converter performance plot showing the efficiency of the converter for various speed ratios, the capacity factor or size factor for the converter for various speed ratios, and the variation of torque ratio with speed ratio for a torque converter.

FIG. 2 shows the typical performance curves for a hydrokinetic torque converter such as the torque converter used in the transmission structure of FIG. 1. When the converter is stalled as indicated in FIG. 2, the speed ratio is zero, but the torque multiplication is a maximum. As the speed ratio increases upon acceleration of the vehicle, the torque ratio decreases until a 1:1 value is achieved at approximately 0.85 speed ratio. The capacity factor is a parameter equal to engine speed divided by the square root of engine torque ($N_e/\sqrt{t_e}$). At a value near a speed ratio 1:1, the capacity factor becomes asymptotic as indicated in FIG. 2.

As the vehicle accelerates from a standing start, the turbine speed is limited by the underdrive ratio of the sheave and chain assembly. After the lockup clutch is engaged, the turbine speed equals the engine speed. Since it is an objective to maintain the engine speed that will achieve minimum brake specific fuel consumption for a given throttle setting, The turbine speed and the throttle setting are controlled to achieve an engine operating condition at points on an ideal speed/torque performance wave. An infinitely variable transmission can accomplish this. As changes in power are demanded by the driver, the engine can operate along a so-called ideal operating curve. This is unlike a conventional multiple ratio transmission which rarely permits engine operation on the ideal curve.

With a transmission of the kind shown in FIG. 1, in contrast to a conventional transmission that does not have infinitely variable characteristics, the engine speed for a given torque will be much lower when the operator demands an increase in power.

The CVT Assembly

In FIG. 1, a transmission is adapted to be bolted or otherwise secured to the engine housing of an internal combustion engine. Numeral 12 designates the end of the engine crankshaft. It is connected by a drive plate to impeller housing 16.

Impeller blades of a torque converter impeller 18 are carried by the impeller housing 16. They define toroidal fluid flow passages that cooperate with bladed turbine 20 to define a toroidal fluid flow circuit in known fashion.

A bladed stator 22 is arranged between the flow entrance section of the impeller 18 and the flow exit section of the turbine 20. It is mounted on an overrunning brake 24 having an inner race that is splined to stationary sleeve shaft 26. Shaft 26 is secured to a shaft support wall of a transmission housing.

The torque converter includes a turbine hub on which clutch plate 32 is mounted for axial movement. The outer periphery of the clutch plate 32 carries a friction ring that is adapted to engage a friction surface 36 formed on the interior of the impeller housing at a radial outward location. The clutch plate 32 cooperates with the impeller housing to define a bypass clutch control chamber 38. An annular pressure feed passage is defined by turbine sleeve shaft 42 and pump driveshaft 44. An annular feed passage communicates with a control valve system located in a control valve body in the transmission housing.

Turbine shaft 42 is splined to carrier 54 of compound planetary gear unit 56, which acts as a forward and reverse gear drive with a direct forward drive ratio and a torque multiplying reverse drive ratio. Gear unit 56 includes sun gear 58, a ring gear 60, a first set of planetary pinions 62, and a second set of planetary pinions 64. The sets of planetary pinions 62 and 64 are journalled on carrier 54. The set of pinions 62 mesh with ring gear 60 and the set of pinions 64 mesh with sun gear 58. The pinions of one set mesh with the pinions of the other set.

Forward drive clutch 70 comprises a multiple disc clutch assembly having friction discs splined to a clutch member, which forms a part of the carrier 54. Clutch 70 includes also friction discs connected drivably to drive sprocket 76.

When the clutch 70 is applied, sun gear 58 is connected through the clutch to the ring gear 60. Thus, torque delivered to the carrier from the turbine shaft will be delivered with a 1:1 drive ratio to the sprocket 76.

A reverse drive friction disc brake 90 has a first set of friction discs connected drivably to ring gear 60. A second set of friction discs is splined directly to the transmission housing. The driving motion of the turbine shaft 42 will be reversed when the brake 90 is applied, thereby driving the sun gear 58 and the drive sprocket 76 in a reverse direction.

A variable displacement pump (not shown in FIG. 1) is connected drivably to the pump driveshaft 44. The variable displacement pump will be described with reference to the circuit diagram of FIGS. 3A, 3B and 3C and to the schematic view of FIG. 7.

Sprocket 76 is connected drivably by means of drive chain 96 to driven sprocket 98 located on a second axis arranged in parallel disposition with respect to the first axis, which corresponds to the axis of crankshaft 12.

Primary sheave assembly 104 is drivably connected to the sprocket 98 by a drive coupling indicated generally by reference numeral 106. This coupling defines a torque sensor as it acts to deliver torque from the sprocket 98 to the primary sheave assembly.

A torque sensor ring 124, which is splined to a servo piston member, is provided with pockets that receive balls 122. The pockets in the member 124 and in the annular piston have ramped surfaces that engage the balls. Thus, when torque is applied to the sheave by the sprocket 98, the balls tend to ramp up their respective ramp surfaces, thereby tending to separate the servo cylinder from the annular servo piston. As torque is delivered to the sheave driveshaft, the magnitude of the separating forces created by the balls and their respective ramps and the resulting torque sensor output pressure are proportional to the magnitude of the torque delivered to the primary sheave assembly by the sprocket 98.

Reference may be made to the aforesaid copending patent application for a complete description of the torque sensor.

A sheave disc 132 is carried by the sheave shaft and a companion sheave disc 134 are slidably disposed on the shaft. The sheave disc 134 is movable axially relative to the sheave disc 132. Disc 134 is coupled to the shaft by a ball spline mechanism 136. Sheave disc 134 cooperates with a fixed annular piston to define a pressure working chamber 146. Pressure is distributed to the working chamber 146.

A drive chain 150 is clamped between juxtaposed conical surfaces of the sheave disc portions 132 and 134. It frictionally engages the cone surfaces of the sheave discs in known fashion. Pressure admitted to the working chambers of the sheave assembly 104 causes axial adjustment of the sheave discs 132 and 134, one with respect to the other, thereby causing the working pitch radius of the drive chain to change as the sheave disc 134 moves axially relative to the shaft on the ball spline connection shown at 136.

The drive chain 150 is trained over a driven sheave assembly 154 disposed on a third axis 158, which is arranged in parallel disposition with respect to the axis for the primary sheave assembly.

The driven or secondary sheave assembly 154 comprises a pair of conical sheave discs 160 and 162 which have cone surfaces that frictionally engage the chain 150. A ball spline connection 176 drivably connects the sleeve 168 to the movable sheave disc 162 allowing the movable sheave disc to move axially relative to the fixed sheave disc 160 while delivering torque.

The sheave disc 162 and the axially fixed piston 172 define a working chamber which can be pressurized by fluid distributed to the sheave assembly through internal passage structure formed in the housing.

The sleeve 168, which forms a part of the driven sheave assembly, is splined to the hub of final drive sun gear 190. This gear meshes with pinions 192 carried by planetary carrier 194. Ring gear 196, fixed to the transmission housing, meshes with the pinions 192. Torque delivered to the sun gear 190 then is multiplied by the final drive planetary gear unit as planetary carrier torque is delivered to the carrier 198 of a final drive differential gear unit 202.

The differential gear unit 202 includes a pair of side gears 204 connected to the axle halfshafts.

As the piston and cylinder for the primary sheave assembly 104 adjusts the spacing between the primary sheave discs, the overall ratio in the driveline changes as the effective pitch radius for the primary sheave increases. A corresponding decrease in pitch radius occurs at the secondary sheave assembly 154, which is valve clamp loading sheave assembly. The clamping load on the drive chain is determined by the chain loading servo shown in part at 172. The effective working area of the primary sheave assembly is double the effective area of the clamp loading sheave assembly 154. Thus, the actuator for the primary sheave assembly is used for ratio control and the actuator for the secondary sheave assembly is used for chain clamping control.

Figure 3A:
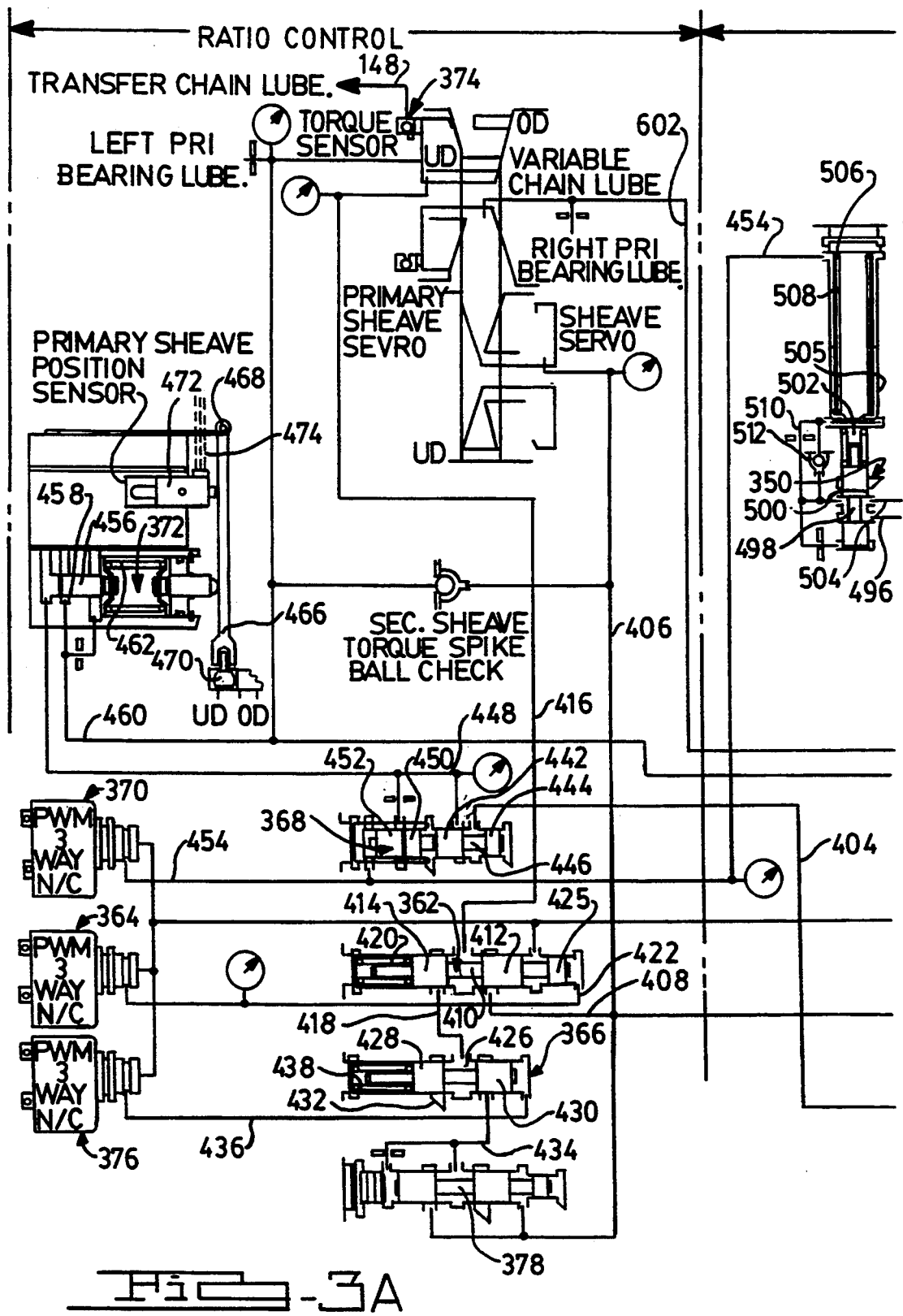
FIGS. 3A and 3B show a control valve system for controlling the ratios of the adjustable sheaves for the transmission of FIG. 1 and for controlling the torque converter bypass clutch.
Figure 3B:
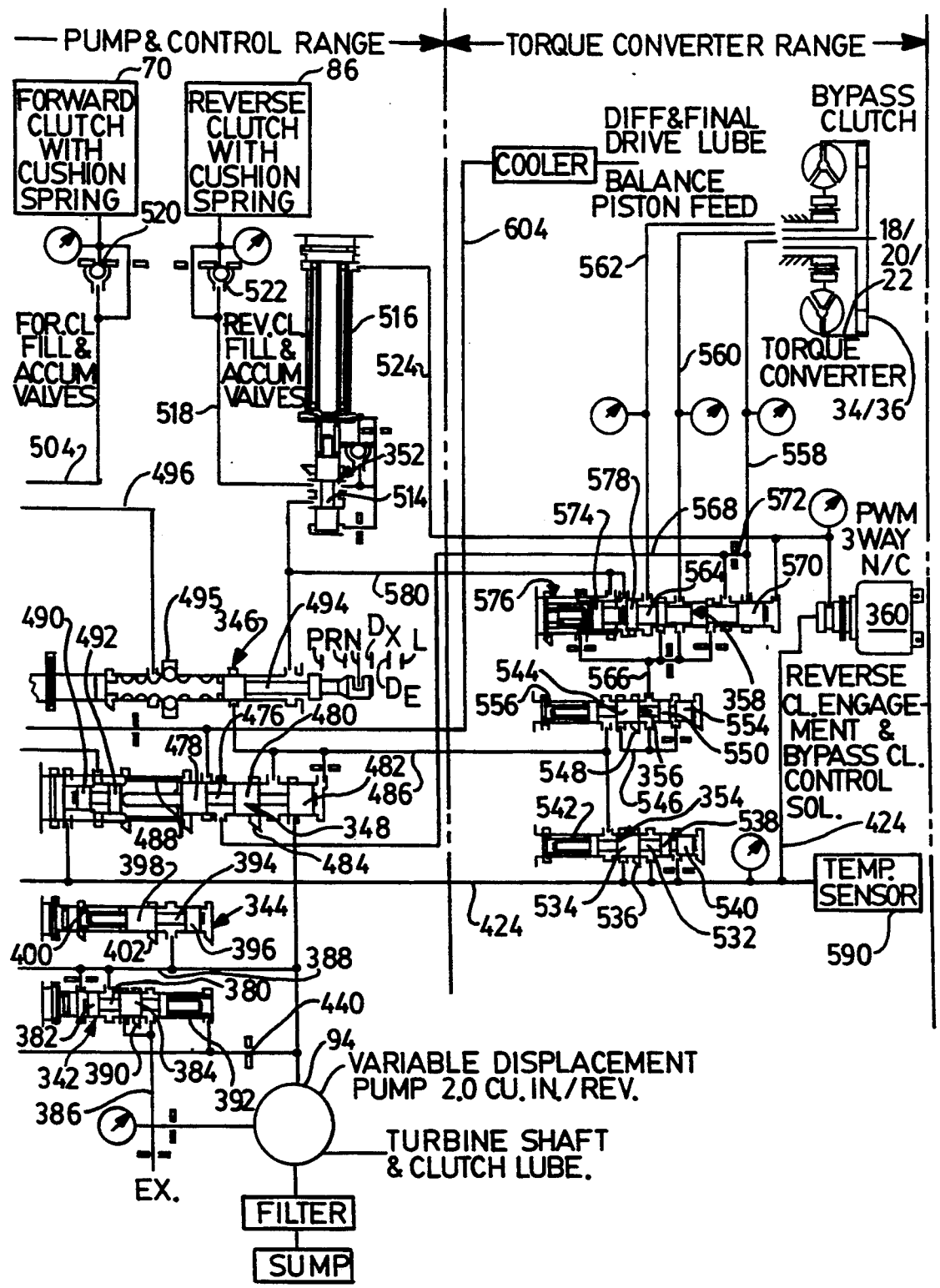

Electrohydraulic Controls of FIGS. 3A and 3B

Electrohydraulic controls for controlling transmission ratio, the pump and clutches and the torque converter are shown in the schematic valve diagram of FIGS. 3A and 3B, taken together. The valve system of these Figures functions to control the pump displacement, the forward and reverse clutches, the torque converter and bypass clutch, and the primary and secondary sheave assemblies. It also provides for control of lubrication fluid delivered to the transmission elements.

The valve system comprises fifteen valves in addition to five ball check valves and four solenoids. The pump control and a pump limit valve are located in the pump assembly apart from the range control valve and the torque converter controls. The torque sensor regulator valve is located on the primary sheave assembly shaft. The balance of the valves are located in the valve body located at the top of the transmission housing.

The control system of FIGS. 3A and 3B provides for a minimum pressure on the primary sheave during start-up conditions. The torque sensor shown in FIG. 3A and the sheave minimum pressure regulator provide pump displacement control. Three of the solenoids are pulse-width modulated solenoids. They are used to control, respectively, the bypass clutch slip, the ratio control and the pump pressure. An on/off solenoid valve is used to switch the primary sheave minimum pressure from a true exhaust to preset percentages of line pressure.

The valve system of FIGS. 3A and 3B will permit vehicle operation in the event of an electronic malfunction, which would interrupt the normal operation of the solenoid valves. In that event, the chain ratio will default to full overdrive and the bypass clutch will remain off. The forward clutch and the reverse brake engagements are controlled by accumulators and the minimum pressure on the primary sheave servo is set to approximately ½ of the pump pressure, This is sufficient to prevent chain slip under such emergency conditions.

The pump control valve is shown at 342 and the pump pressure limit valve is shown at 344, The pump control valve sets the pump pressure by controlling pump displacement for pump 94. The pressure limit valve limits the pump pressure and the pressure for the sheave assemblies.

A manual valve 346 controls the exhaust for the forward-and-reverse drive clutch and brake circuits in park and neutral. It provides also a feed for the forward drive clutch circuit in drive range and low range operation. It also provides a feed for the reverse brake circuit when it is shifted to the R position.

A clutch pressure regulator valve 348 sets the clutch feed pressure and controls the cooler flow and the variable chain lubrication flow.

A forward clutch fill and accumulator valve 350 controls the forward clutch engagement. It responds to sheave pressure booster pulse-width modulated solenoid pressure. Reverse clutch fill and accumulator valve 352 controls the reverse clutch engagement, It is controlled by the bypass control pulse-width modulated solenoid.

A solenoid regulator valve 354 provides a feed under regulated pressure to the solenoid valves. A converter regulator valve 356 provides a feed for the converter and regulates the converter pressure. A bypass clutch control valve 358 provides for converter feed and for regulating the converter bypass clutch differential pressure. The bypass clutch is controlled in turn by the pulse-width modulated bypass clutch control solenoid valve shown at 360.

A primary sheave control valve 362 controls the chain ratio by regulating the flow to and from the primary sheave assembly. It is controlled in turn by the ratio control pulse-width modulated solenoid 364.

The primary exhaust regulator valve 366 provides a regulated exhaust pressure for the primary sheave assembly that is proportional to the pump pressure. A sheave pressure booster 368 boosts the pump pressure above the sheave minimum pressure required to avoid slip. It is controlled by the sheave pressure booster pulse-width modulated solenoid 370.

The sheave minimum pressure regulator 372 maintains a minimum pressure in the primary sheave assembly and in the secondary sheave assembly. The torque sensor pressure regulator 374 provides a torque signal that is proportional to input torque on the driving sheave assembly.

An on/off solenoid valve 376 controls the primary exhaust control valve 366. Primary exhaust regulator 378 provides a regulated exhaust pressure for the primary sheave servo that is proportional to the pump pressure.

The pump control valve 342 is a regulator valve having a valve spool 380 with regulating valve lands 382 and 384. Pump discharge pressure in line 386 communicates with valve 342 and the degree of communication between line 386 and regulator line pressure passage 388 is controlled by land 384. Land 384 also controls the degree of communication between the passage 386 and exhaust port 390. Valve spring 392 urges the valve element 380 in a left hand direction. Feedback pressure from line 388 is distributed to the left hand side of the land 382.

The line 388 communicates with the pump pressure limit valve, which comprises a valve spool 394 having spaced lands 396 and 398. Valve spool 394 is urged in a right hand direction by valve spring 400.

Land 398 restricts the degree of communication between passage 388 and exhaust port 402. Thus, the valve 344 restricts the pump output pressure to a predetermined value, which may be approximately 85 psi.

The pump control valve 342 adjusts the pump displacement control pressure in the pump 94 to vary the pump displacement. The pressure in the control chamber for the pump and the flow are adjusted to maintain a 20 psi differential pressure between the boosted minimum sheave pressure and the pump outlet pressure, the boosted minimum sheave pressure being the pressure in line 404 which extends to the sheave pressure booster valve 368 and which communicates with the discharge side of the pump 94.

Regulated line pressure on the output side of the pump control valve 342 communicates directly with the secondary sheave servo through line 406. The primary sheave control valve 362 also communicates with the outlet side of the pump 94 through line 408. Primary sheave control valve 362 includes a valve spool 410 having flow control lands 412 and 414. Land 412 controls communication between passage 408 and passage 416 which extends to the primary sheave working chamber. Land 414 controls communication between passage 416 and passage 418, which extends to the primary exhaust control valve 366. Valve spring 420 urges the valve spool 410 in a right hand direction. Pressure in the ratio control solenoid pressure passage 422 acts on the right hand end of a third land 425 on the valve spool 410. Pressure in passage 422 is controlled by the pulse-width modulated three-way solenoid valve 364, which is a normally closed valve. When the valve 364 is energized, communication is established between the solenoid feed pressure passage 424 and passage 422. Pressure in passage 422 thus is a function of the duty cycle for the solenoid valve 364. Solenoid feed pressure acts also on the differential area of lands 412 and 425, which establishes a force that opposes the force of the spring 420.

When the valve 362 assumes the position shown in FIG. 3A, the pressure in passage 416 and in the working chamber of the primary sheave servo is trapped and the torque ratio established by the chain and sheaves will remain unchanged. This is a so-called steady state or null condition. Flow of fluid to and from the primary servo is shown in FIG. 9 where servo fluid flow is plotted against valve position. The null condition is shown by the legend "NULL". If the value of the signal in passage 422 should decrease, communication will be established between passage 408 and passage 416, and communication between passage 416 and exhaust passage 418 will be prevented. This will tend to increase the pressure in the primary sheave servo, thus tending to move the drive chain toward its overdrive position as the sheave discs are moved closer together. On the other hand, if the signal in passage 422 should increase, communication between passage 408 and 416 will be prevented as communication between passage 418 and passage 416 is established. This will tend to exhaust pressure from the primary sheave servo and the servo disc will separate thereby allowing the chain to assume an underdrive position.

Passage 418 leads to primary exhaust control valve 366. It comprises a valve spool 426 having spaced lands 428 and 430. Land 428 controls communication between line 418 and exhaust port 432. Land 430 controls communication between passage 418 and passage 434 which leads to the primary exhaust regulator valve. The primary exhaust control valve can be shifted by a primary exhaust control solenoid pressure in passage 436, which leads to valve 376. That valve is an on/off three-way solenoid valve that normally is closed. Valve 376 and previously described valves 364 and 370 are supplied with solenoid feed pressure from passage 424. When pressure in passage 436 is present, the valve spool 426 will be shifted to the left against the force of valve spring 438.

The boosted minimum sheave pressure in passage 404 is distributed to the sheave pressure booster valve 368. Passage 404 communicates with the discharge side of the pump 94 across a control orifice 440.

Passage 404 communicates with the valve 368 between lands 442 and 444 on booster valve spool 446. Lands 442 and 444 have a differential area. Thus, the pressure in passage 404 biases the valve spool 446 in a left hand direction. The minimum sheave pressure developed in minimum sheave pressure passage 448 is fed back to the differential area of lands 450 and 452. The sheave pressure booster valve 368 is under the control of the output signal of valve 370. That pressure signal is distributed through passage 454 to the left side of land 452. An increase in the signal in passage 454 will result in a decrease in the degree of communication between passage 404 and passage 448 extending to the sheave minimum pressure regulator valve 372.

The sheave minimum pressure regulator valve 372 comprises a valve element 456 received in valve bore 458. Passage 448 communicates with the valve bore at the left side of the valve element 456. The valve land on the valve element 456 controls the degree of communication between passage 448 and torque sensor passage 460. Valve spring 462 acts on valve element 456 and urges it in a left hand direction as seen in FIG. 3A.

Valve spring 462 also acts on a lever 466 having a fixed pivot 468. The operating end 470 of the lever 466 is connected mechanically to the movable sheave disc 134 of the primary sheave assembly 104. Thus, the degree of communication between the minimum sheave pressure passage 448 and the torque sensor feed passage 460 depends upon the spring force of the spring 462 which, in turn, depends upon the drive ratio of the sheave assemblies.

A primary sheave position sensor 472 has a movable core that mechanically engages the lever 466 so that the reactance of field windings for the sensor 472 will change depending upon the position of the sheave discs of the primary sheave assembly. The output of the position sensor 472 in signal output leads 474 thus is a motion-to-voltage output transducer signal. Thus, sheave minimum pressure regulator and the sheave pressure booster valve cooperate to produce the boosted minimum reference pressure in passage 404. The torque sensor and the sheave minimum pressure regulator provide adequate pump pressure for the purpose of clamping the secondary sheave. Adjustments in the secondary sheave pressure are made by the pump control valve as pressure in passage 404 communicates with the spring chamber for the valve 342. An increase in the pressure in passage 404 will result in an increase in the pressure in passage 386 which decreases the displacement of the pump 94.

The clutch regulator valve 348 comprises a valve spool 476 which has spaced lands 478, 480 and 482. Lands 480 and 482 control the degree of communication between passage 388 and exhaust port 484 and the degree of communication between clutch pressure passage 486 and passage 388. The valve 348 regulates the pressure in passage 388 to produce a regulated clutch pressure in passage 486. The regulated pressure acts on the right hand end of the land 482, which produces a regulated pressure force that opposes the force of valve spring 488. Regulated solenoid feed pressure in passage 424 is distributed to the left side of booster land 490 and torque sensor pressure in passage 460 acts on the differential area of land 490 and land 492 of the booster for the clutch regulator valve assembly 348. The clutch pressure then increases upon an increase in the torque sensor pressure.

The manual valve 346 comprises a valve spool 494 having spaced valve lands that distribute clutch pressure from passage 486 to either the forward clutch or the reverse clutch depending upon whether the valve spool 494 is adjusted to the reverse position R or one of the drive range positions Dx, De or L. A ball detent mechanism 495 defines each of the operative positions of the manual valve element 494. When the valve spool 346 is moved to the right of the position shown pressure is distributed from clutch pressure passage 486 to passage 496, which leads to the forward clutch fill and accumulator valve assembly 350. Valve 350 comprises a valve spool 498 with spaced lands that are received in valve chamber 500. Valve spool 498 is urged in a downward direction, as viewed in FIG. 3B, by valve spring 502. The lands on valve spool 498 establish communication between clutch pressure passage 496 and forward clutch feed passage 504. When the valve element is positioned as shown at the beginning of forward clutch engagement, pressure in passage 496 acts on the lower end of the valve spool 498. The same pressure acts on accumulator piston 505 which is urged in a downward direction as viewed in FIG. 3B by accumulator spring 506.

Piston 505 is situated in accumulator valve chamber 508. As pressure is distributed from passage 504 through control orifice 510 to the accumulator piston, pressure gradually builds up in passage 504, thus providing a cushioned engagement for the forward clutch. The piston 505 strokes against the force of valve spring 506 during clutch pressure buildup. During the clutch engagement period, the pressure in the clutch acts against the force of spring 506 as well as the pressure force in passage 454 on the output side of the pressure booster and forward clutch engagement solenoid valve 370. Quick release of the forward clutch occurs when the manual valve is moved to the reverse position as orifice 510 is bypassed by one-way check valve 512.

The reverse clutch engagement is controlled by the reverse clutch fill and accumulator valve assembly 352. This valve operates in a manner similar to the operation of the valve 350. It includes a valve spool 514 corresponding to the valve spool 498 for the forward clutch. Valve assembly 352 also includes an accumulator piston 516 which operates in a manner similar to the accumulator piston 505 for the forward clutch.

In the case of each of the clutch control valves 350 and 352, the valve and the accumulator are parallel to the clutch. The accumulator and clutch valve arrangement allows the valve to fill with no restriction. Each accumulator is fed through an orifice and exhausted through a ball check valve. Further, each passage 505 and 518, which are clutch feed passages, contains a one-way check valve element, as shown at 520 and 522, respectively. These valve elements protect against clutch tie-up under rapid range selecting conditions. As in the case of the forward clutch, which receives back pressure from a pulse-width modulated solenoid valve, the reverse clutch receives back pressure from the reverse clutch engagement and bypass clutch control solenoid valve 360 through passage 524.

The torque converter controls include the solenoid regulator valve 354, which supplies a regulated solenoid pressure in passage 424 as described previously. This valve is a regulator valve with a valve spool 532 which has a valve land 534 that controls communication between solenoid feed pressure passage 424 and clutch pressure passage 486. It also controls the degree of communication between passage 424 and exhaust port 536. Feedback pressure in passage 424 is distributed to the differential area of lands 538 and 540. The force developed by the pressure on the differential area of lands 538 and 540 acts against spring 542, thus establishing a regulator action. Passage 424 feeds reverse clutch engagement and bypass clutch solenoid control valve 360 as well as the pulse-width modulated valves 370 and 364 and the on/off valve 376.

The clutch pressure in passage 486 is distributed to the converter regulator valve 356 which acts in a manner similar to the action of valve 354. Valve 356 includes land 544 which controls the degree of communication between passage 486 and passage 546. It also controls the degree of communication between passage 546 and exhaust port 548. Feedback pressure in passage 546 is distributed to the differential area of lands 550 and 554. The force developed by the pressure acting on the differential area of lands 550 and 554 opposes the force of valve spring 556.

Output pressure from the converter regulator valve is distributed to the multiple land bypass clutch control valve 358. This valve controls flow into and flow from the torque converter circuit as well as flow to the bypass clutch control chamber and flow from the bypass clutch control chamber. Flow from the converter passes through passage 558. Flow to the converter passes through passage 560. The flow of bypass clutch actuating fluid passes to the bypass clutch control chamber through passage 562.

Valve 358 includes a valve spool 564 which establishes communication between the bypass clutch feed passage 562 and converter regulator valve outlet pressure passage 566. When the valve spool is shifted in a right-hand direction, fluid is fed directly from passage 566 to the bypass clutch, thus unlocking the bypass clutch, and the converter acts as an open converter. Fluid passes directly to the converter circuit through the bypass clutch chamber and also through converter feed passage 560. The converter fluid flow from the converter passes through the passage 568.

When the bypass clutch is locked, land 570 blocks direct communication between passage 558 and converter outlet passage 568, although flow between these passages is permitted by flow restricting orifice 572.

The right side of land 570 receives output pressure from the reverse clutch engagement and bypass clutch control solenoid 360, which is present in passage 524 as explained previously.

The converter regulator valve 356 controls the upper limit for the converter charge pressure to about 100 psi. The solenoid regulator valve establishes an upper limit of about 58 psi in passage 424. The output of the converter regulator valve acts on a differential valve land area for bypass clutch control valve land 574. It produces a force that supplements the force of clutch regulator valve spring 576.

Valve element 564 includes also a valve land 578 which is pressurized by reverse clutch pressure in passage 580, thus assuring that the bypass clutch is released during reverse drive. A temperature sensor 590 is located in the solenoid feed line 424 for the purpose of developing a signal that may be used by the microprocessor.

Figure 10:
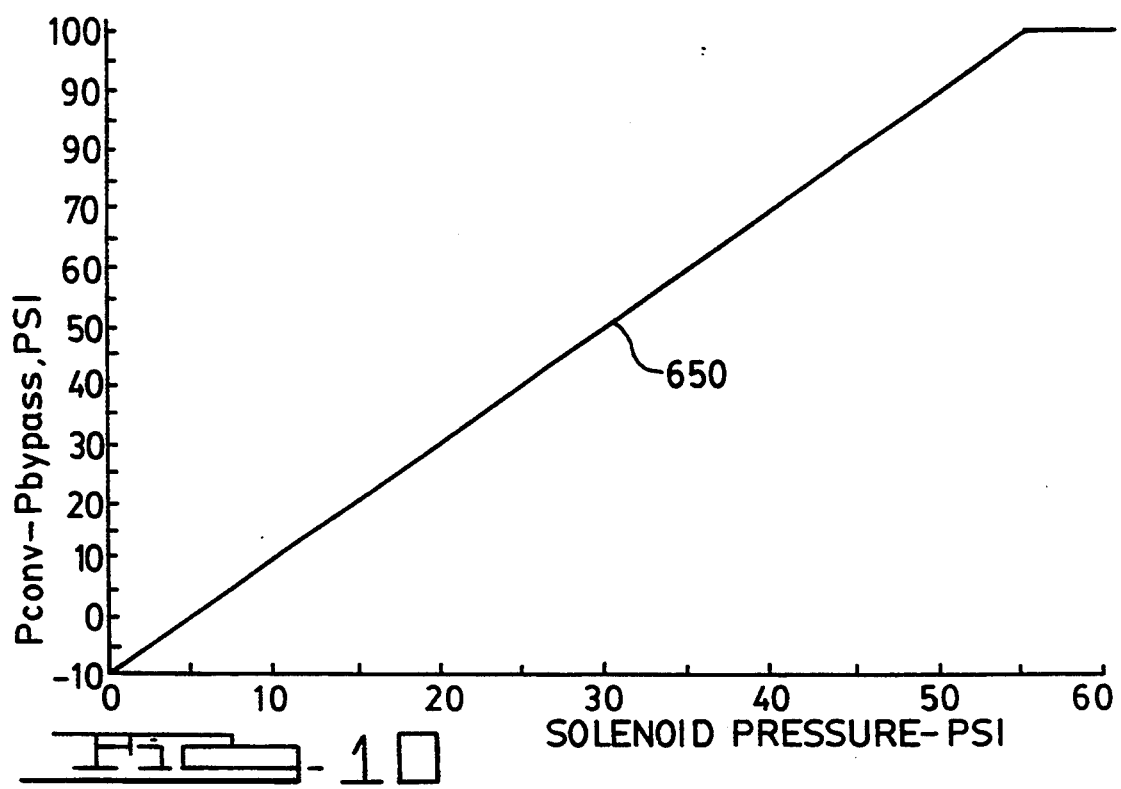
FIG. 10 is a plot of the pressure differential for the clutch plate of the bypass clutch assembly for various solenoid pressures for the bypass clutch solenoid.

FIG. 10 shows the bypass clutch control valve characteristics for the solenoid valve 360. Solenoid pressure shown on the abscissa of FIG. 10 controls the differential pressure across the bypass clutch relative to the converter charge pressure, as indicated by the straight line relationship of FIG. 10. The solenoid feed regulator 356 is set so that the feed pressure is established at about 58 psi.

During the ratio control for the circuit of FIGS. 3A and 3B, the flow for the pump is distributed directly to the secondary servo, as mentioned previously. The pump flow that is diverted to the primary shift control valve controls the primary shift flow both to and from the primary servo. Since the primary servo has nearly twice the servo apply area as the secondary servo, the secondary servo is used to control chain clamping forces, and the primary servo is used to control ratio.

The overlapping of lands 414 and 412 of the primary shift control valve will provide for a constant sheave ratio since flow to each servo and exhaust fluid from each servo is prevented, thus providing a hydraulic lock as a constant ratio is maintained. If the pulse-width modulated solenoid valve 364 is triggered to cause the valve spool 410 to shift in a left-hand direction, passage 416 is exhausted. If the valve spool 410 is shifted in the other direction, primary shift pressure is delivered from passage 408 to passage 416. This corresponds to a downshifting to underdrive in the valve and sheave assembly. The operating state in which the primary sheave is exhausted corresponds to an upshifting to overdrive.

The primary exhaust control valve will regulate the pressure in passage 418 to maintain a pressure of about one-half of the pump pressure. Thus, depending upon whether the on/off valve 376 is actuated, the primary exhaust control valve will determine whether the exhaust port for the primary shift control valve communicates with true exhaust or to a regulated exhaust. Thus, the primary sheave servo will always remain pressurized, even when the chain is in its full underdrive position.

Figure 11:
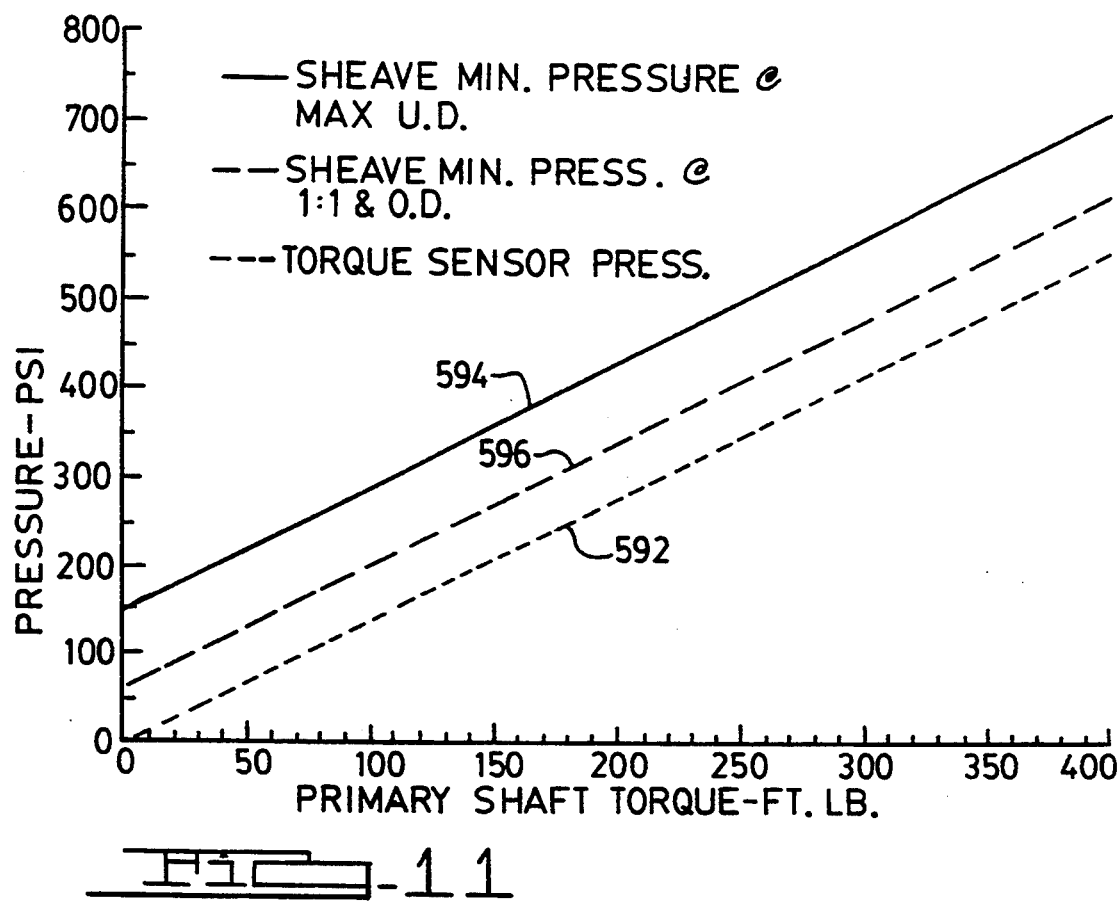
FIG. 11 is a plot showing the sheave minimum pressure schedule for the primary sheave of the transmission of FIG. 1.

As previously explained, the torque sensor, the sheave minimum regulator pressure valve and the sheave pressure booster valve provide a reference pressure for establishing the pump outlet pressure. The minimum pressure for the sheave minimum pressure regulator is a function of the primary shaft torque and the chain ratio. This characteristic is shown in FIG. 11 where sheave minimum pressure is plotted on the ordinate and the primary shaft torque is plotted on the abscissa. The output pressure of the torque sensor is shown with the linear functional relationship designated by numeral 592. Reference numeral 594 shows a minimum pressure when the primary sheave is moved to its maximum underdrive position. When the primary sheave is in its one-to-one ratio and its overdrive position, the sheave minimum pressure schedule is lower as indicated by line 596 in FIG. 11.

The torque sensor functions to convert the torque on the primary sheave shaft to a pressure with a gain of 1.4 psi per lbs.-ft. The exhaust from the torque sensor, which functions as a constantly open orifice blow-off valve, is directed to the lube circuit for the fixed transfer chain 96 and the torque sensor splines, the lubrication circuit being defined in part by passage 148. The sheave minimum pressure regulator augments the effect of torque sensor pressure as the sheave ratio changes. This is accomplished by the pivoting arm 466, which follows the motion of the primary sheave piston. The arm 466 provides the input signal for the sheave minimum pressure valve. The linear potentiometer, as shown at 472, provides the microprocessor with an indication of the primary sheave position.

Figure 12:
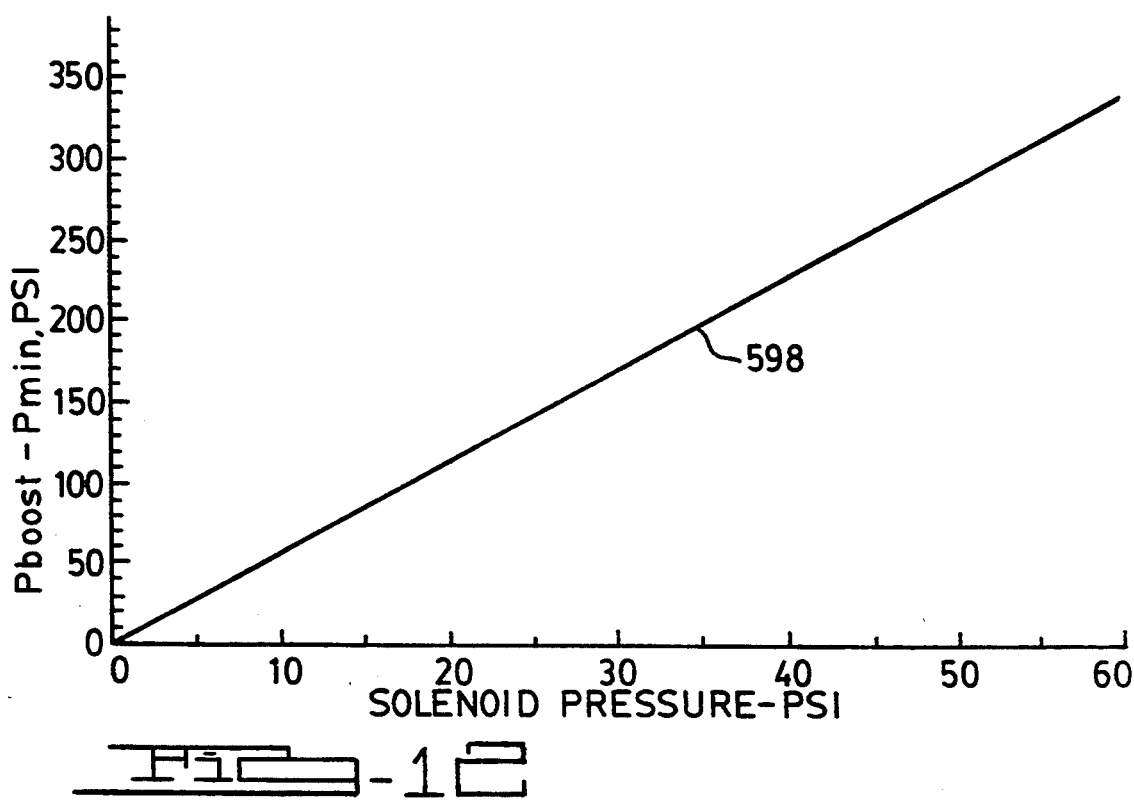
FIG. 12 is a plot of the sheave pressure booster characteristics, specifically the relationship between solenoid pressure and boost pressure.

The sheave pressure booster valve provides a boost in the pump pressure by adding pressure to the required minimum sheave pressure. The magnitude of that added pressure depends upon the output signal of the pulse width modulated solenoid valve 370. The relationship of solenoid pressure to the boost pressure established by the sheave pressure booster valve is plotted in FIG. 12. For each value of solenoid pressure established by solenoid valve 370 there is a resulting pressure equal to the boost pressure minus a minimum sheave pressure. That differential pressure is plotted on the ordinate. The relationship between the solenoid pressure and the effective boosted minimum sheave pressure is a linear relationship as indicated in FIG. 12 at 598.

In FIGS. 3A and 3B, the lube circuit for the variable ratio chain, designated by reference numeral. 602, is connected to the clutch regulator valve. Distribution of lube to the passage 602 is controlled by valve land 478.

An oil cooler is supplied with fluid through passage 604, which also communicates with the clutch regulator valve and with the lube passage 602. The return flow from the cooler supplies the final drive and differential assembly with lubrication fluid.

Figure 8:
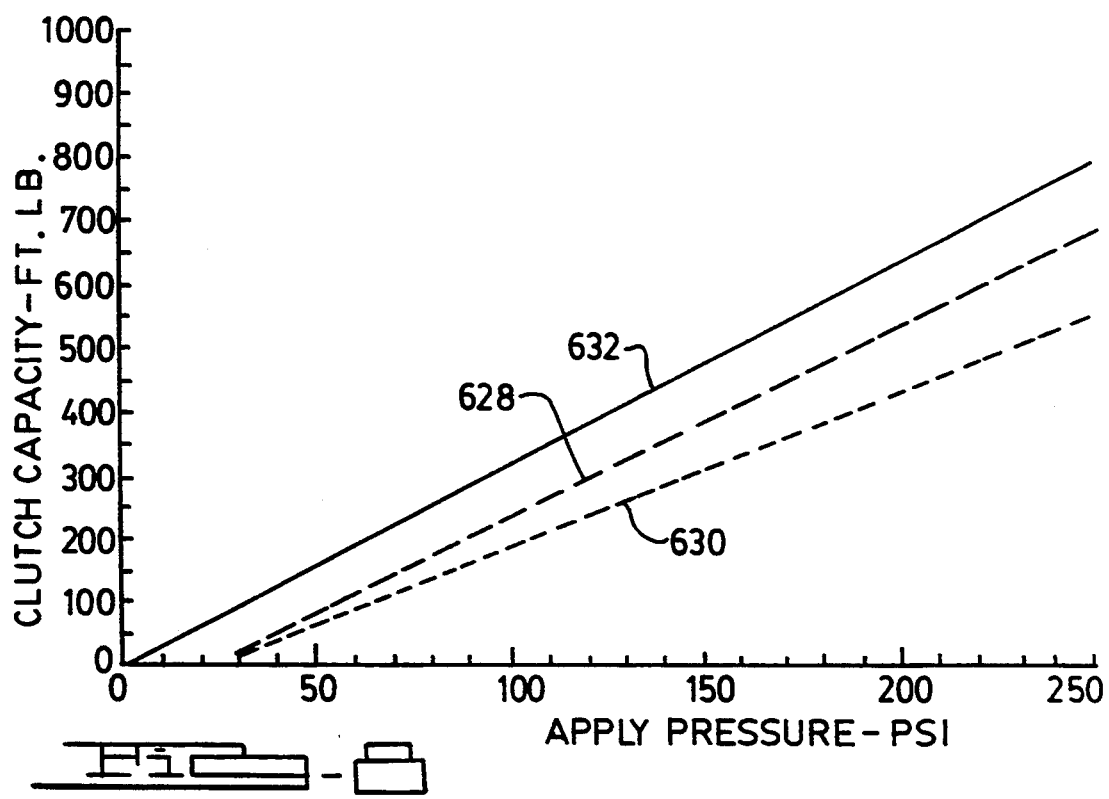
FIG. 8 is a plot showing the clutch capacity for the friction clutches in the transmission of FIG. 1 as the apply pressure changes.

FIG. 8 shows the clutch capacity characteristics for the bypass clutch, the reverse clutch and the forward clutch. Each clutch capacity is related linearly to the apply pressure, the latter being plotted on the abscissa. The clutch capacities for the bypass clutch, the reverse clutch and the forward clutch are shown on the ordinate. As the apply pressure is increased, the capacity is increased linearly in accordance with the characteristic shown at 628 in the case of the reverse clutch, at 630 in the case of the forward clutch, and at 632 in the case of the bypass clutch.

Figure 7:
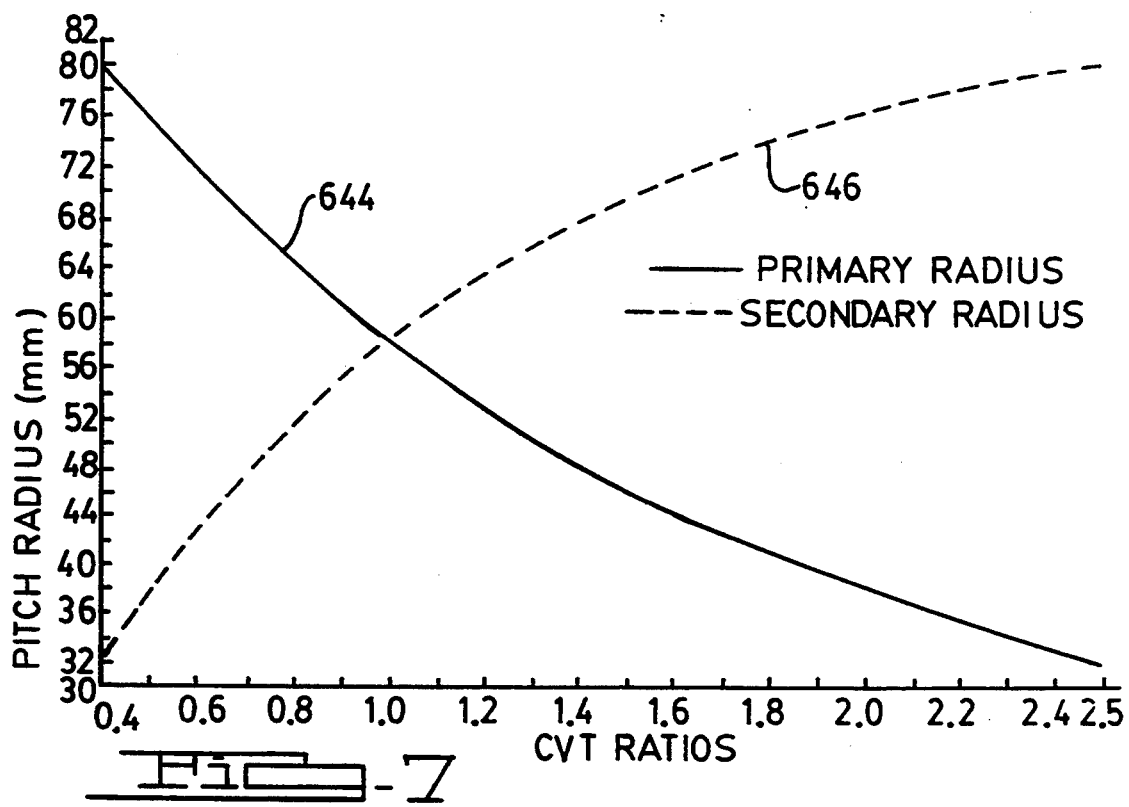
FIG. 7 is a plot showing the pitch radii of the primary sheave and secondary sheave for various speed ratios.

As explained previously, the pitch radii for the primary sheave assembly and the secondary sheave assembly change as the overall ratio varies, a decrease in the effective pitch radius for the primary sheave assembly being accompanied by a corresponding increase in the pitch radius for the secondary sheave assembly and vice versa. In FIG. 7, we have shown the relationship between sheave drive ratio and the pitch radius for the primary sheave assembly by curve 644. Curve 646 shows the corresponding relationship between ratio and pitch radius for the secondary sheave assembly. Curve 646 as a mirror image of curve 644. .An effective ratio of 1:1 is achieved when the pitch radii are equal. This occurs at a pitch radius of about 58 millimeters, as indicated in FIG. 7, for a preferred embodiment of the invention.

As mentioned earlier, the pulse width modulated valve 360 of FIG. 3B controls the bypass clutch control valve 358. The pressure signal developed by the solenoid valve 360 acts on the bypass clutch control valve to produce a bypass clutch engagement pressure. This pressure is opposed by the converter pressure. Thus, the bypass clutch engagement pressure is the difference between converter pressure and bypass clutch pressure. That pressure differential across the bypass clutch is plotted in FIG. 10 on the ordinate. The abscissa in FIG. 10 is a solenoid pressure output. The bypass clutch differential pressure is linearly related to the output of the solenoid valve 360, as indicated by reference numeral 650 in FIG. 10.

FIG. 3C shows in schematic form the overall electrohydraulic control system comprising the microprocessor, the electrohydraulic controls, the transmission and the engine in block diagram form. The microprocessor is identified in FIG. 3C by the numeral 652. The electrohydraulic controls described with reference to FIGS. 3A and 3B are identified in FIG. 3C by reference numeral 654. The transmission, which comprises the primary and secondary sheave assemblies described with reference to FIG. 1, is identified in FIG. 3C by reference numeral 656. The engine is identified by reference numeral 658.

Electronic Control

The microprocessor 652 comprises a central processing unit, memory, custom input signal conditioning circuits, and custom output driver circuits. It also has a clock for controlling the CPU. The control strategy is stored in a single memory chip (ROM). The input signal conditioning circuit forms an interface between the CPU and the analog and digital sensor devices. The output signal conditioning circuit interfaces the digital outputs from the CPU with the external solenoid driver circuits.

The input signals for the electronic microprocessor 652 include a signal developed by a Hall effect engine speed sensor and a turbine speed Hall effect sensor as well as three variable reluctance speed sensors.

A forward clutch speed sensor includes a pickup,- located in the housing. As the turbine rotates, the sensor reads only turbine speed when the forward clutch is engaged. In reverse, the sensor reads 1.153 times the turbine speed because of the planetary gearing. The sensor also is used to indicate primary shaft speed. The primary shaft speed is equal to the speed measured at the sensor divided by the fixed transfer chain ratio. The secondary sheave speed sensor is a variable reluctance sensor. It can be used in place of the output sensor, or it can be used to hold a constant ratio.

An output speed sensor is mounted on the differential housing portion of the transmission housing. As in the case of the secondary shaft speed sensor, it is a variable reluctance sensor which pickup electrical impulses from teeth located on the differential carrier shown in FIG. 1.

Figure 13:
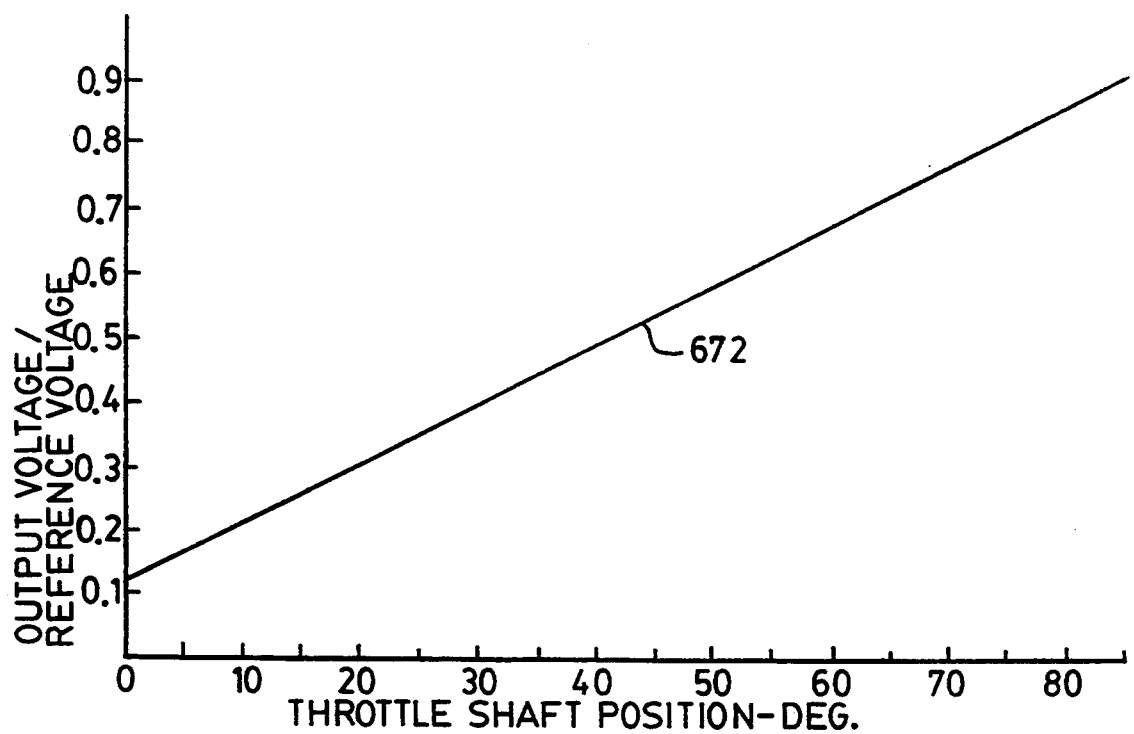
FIG. 13 is a plot of the throttle position sensor transfer function, specifically the relationship between output voltage of the throttle position sensor versus throttle shaft position.

The throttle position sensor is a variable-resistance, rotary potentiometer. The controller will apply a reference voltage to the sensor and the throttle position output signal that results depends on the throttle position since the throttle position determines the resistance of the potentiometer. The transfer function for the throttle position sensor is shown in FIG. 13, where throttle position is plotted against output voltage divided by the reference voltage supplied by the controller. The relationship between voltage and throttle position is a linear relationship, as shown by the function 672 in FIG. 13.

Figure 14:
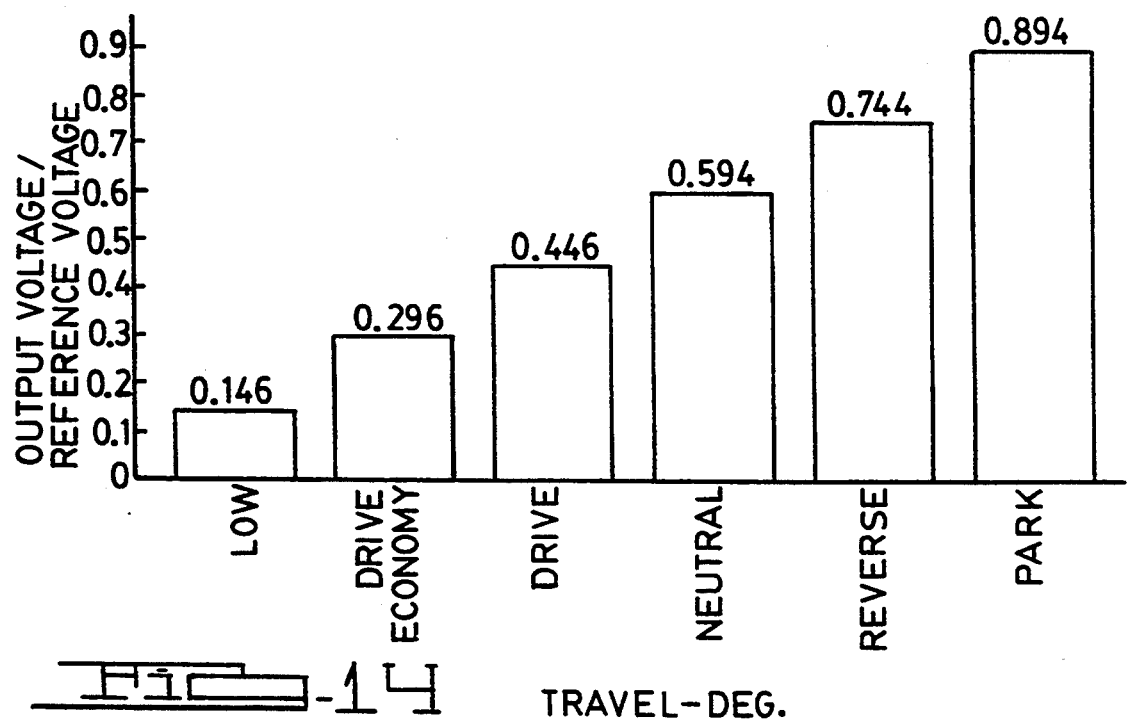
FIG. 14 is a plot of the range selector position sensor transfer function, specifically the voltage signals that are developed for each of the multiple range positions of the manual valve.

The range position sensor is a rotary sensor that contains a series of resistors. Each resistor is brought into operation as the range position lever is moved by the operator. This provides a changing resistance for the sensor as the lever is moved. This is indicated in FIG. 14 where the travel of the range selector lever is plotted on the abscissa and the signal output voltage divided by the reference voltage is plotted on the ordinate. As the range position lever moves from the low to the park position, the voltages progressively increase in steps as indicated in FIG. 14.

The primary sheave position sensor is a linear potentiometer as in the case of the throttle position sensor. As indicated in FIG. 3A, lever 466 picks up movement of the primary sheave disc 134 and loads a sheave minimum pressure regulator valve as previously explained.

Figure 15:
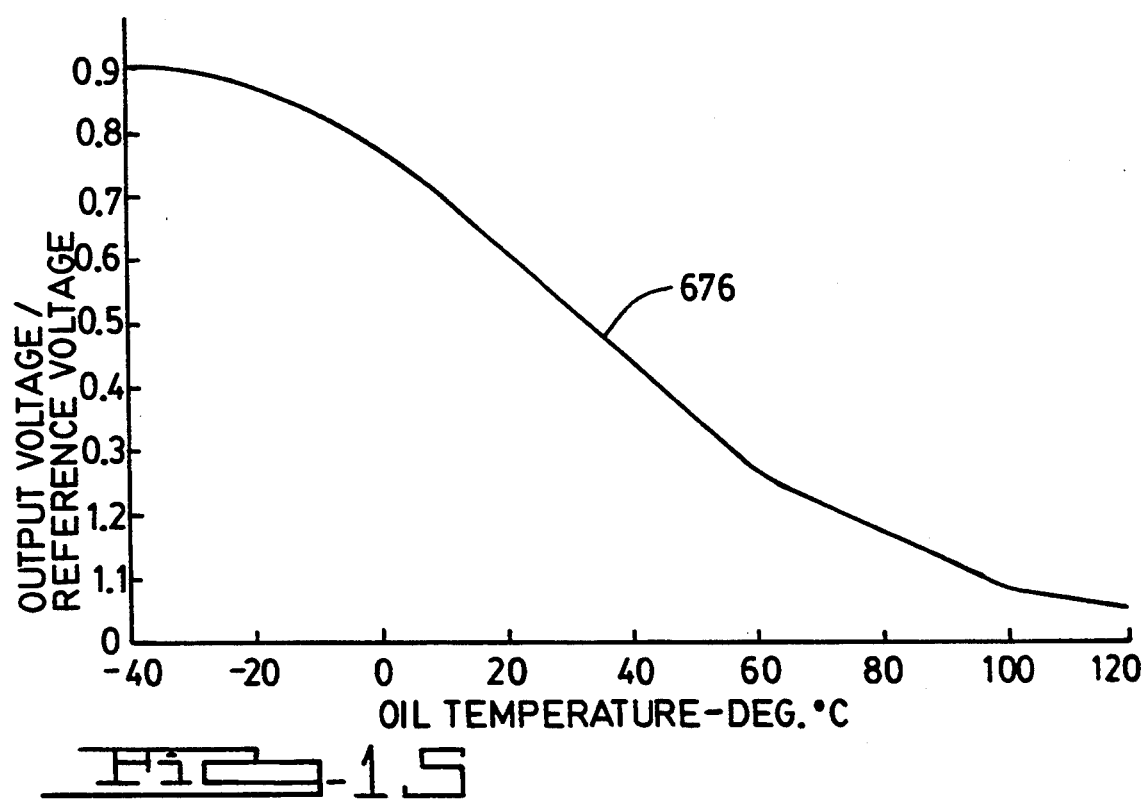
FIG. 15 is a plot showing the oil temperature sensor transfer function, specifically the relationship between oil temperature and output voltage for the temperature sensor.

The oil temperature sensor is located in the control assembly as indicated earlier. It contains a thermistor disc which operates between −40° C. and 150° C. The resistance of the thermistor varies non-linearly and inversely as temperature increases. The transfer function for the oil temperature sensor is indicated in FIG. 15 where oil temperature is plotted against output voltage for the sensor divided by the reference voltage. The inverse nonlinear relationship between these two variables is indicated by the plot 676.

Figure 17:
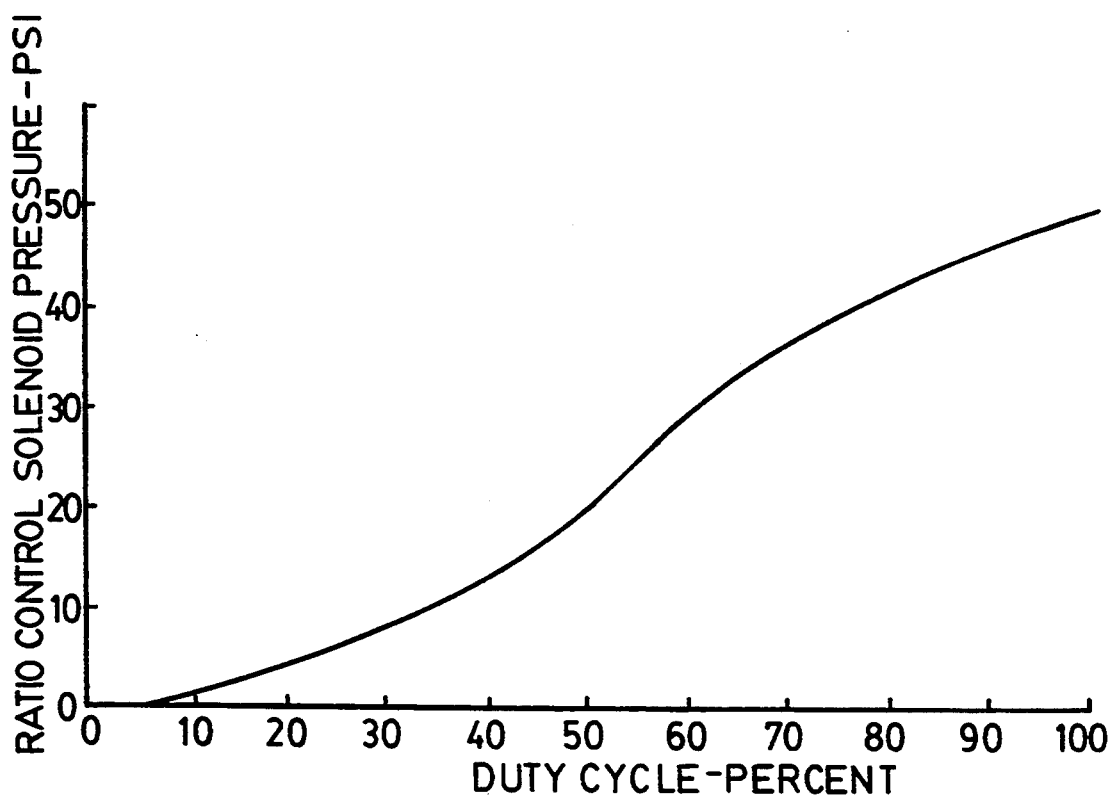
FIG. 17 is a plot of the duty cycle versus ratio control solenoid pressure.

FIG. 17 is a plot that shows the relationship between the duty cycle of the ratio control solenoid valve 364 and the ratio control solenoid pressure that is distributed to the valve 362. The solenoid pressure that will establish the previously described ratio null occurs at about 47% duty cycle, which corresponds to a solenoid pressure of about 17 psi. When the duty cycle is about 47%, the primary servo is locked in its steady state condition since the exhaust path through the primary sheave control valve at that time is blocked, thus establishing a hydraulic lock for the servo cylinder.

The output signals shown in FIG. 3C are signals developed by the output signal conditioning portion of the processor 652 for the signals that are delivered to the control solenoids 360, 370 and 364 and 376. These are all 3-way normally closed solenoids. Three of these solenoids have low resistance coils for pulse width modulation. These are solenoids 370, 364 and 360. Solenoid 376 has a high resistance coil for on/off use.

The ratio control strategy and the bypass clutch strategy require closed loop feedback control, which will be described subsequently. The closed loop bypass clutch control is a simple proportional-integral-derivative controller as indicated in schematic form in FIG. 18. The turbine speed control is indicated in FIG. 19. This also will be described subsequently.

In each case, a PID controller compensates for signal variations. The integral term is multiplied by the software loop time and the differential term is divided by the loop time. The loop time should be relatively constant since varying loop times may lead to control system instability.

The pulse width modulated solenoid valves function in such a way that the duty cycle signals are updated at a rate equal to an integer multiple of the software loop frequency. The duty cycles are updated every loop to ensure quick system response. The loop time, however, must be long enough to allow completion of all the required algorithms.

Figure 16:
FIG. 16 is a diagrammatic illustration of the digital input filter for conditioning the input signals for the microprocessor of FIG. 3C.

The input processing portion of the processor will sample all of the analog inputs prior to fetching the appropriate algorithm from the memory (ROM). The control algorithm signals first convert from analog values to digital engineering values. Each input passes through a digital rolling average filter to minimize oscillations in the data before entering the calculation routines. Each signal has its own set of filter adjustments. A typical filter flow diagram is illustrated in FIG. 16. The signal flow equation for the filter illustrated in FIG. 16 is stated as follows:

$$\overline{Z}(K) = C1*Z(K) + C2*Z(K-1) + C3*\overline{Z}(K-1)$$

WHERE:
- $\overline{Z}(K)$ = PRESENT FILTERED SAMPLE
- $Z(K)$ = PRESENT UNFILTERED SAMPLE
- $Z(K-1)$ = FIRST PAST UNFILTERED SAMPLE
- $\overline{Z}(K-1)$ = FIRST PAST FILTERED SAMPLE
- C1, C2, & C3 ARE CALIBRATION PARAMETERS WITH THE FIXED RELATIONSHIP OF $C1+C2+C3=1$ The bypass clutch engagement strategy depends on vehicle conditions. The bypass clutch can operate in an open converter mode, a scheduled slip mode wherein a steady state driving condition will result in a predetermined clutch slip. A "tip-in" slip occurs when the vehicle engine accelerator pedal is quickly advanced, and a backout slip which occurs when the vehicle engine throttle is suddenly relaxed. The converter also may operate in a fully locked condition, which is a special case of the scheduled slip mode.

A block diagram of the bypass clutch feedback control system is indicated in FIG. 18.

During acceleration, the bypass clutch controller will cause the converter to operate as an open converter. If the oil temperature is cold, the bypass clutch should remain off while the transmission oil warms up. Further, if the slipping conditions are such that the temperature at the bypass clutch friction surfaces exceeds a recommended value such as 300°, the bypass clutch will be caused to disengage.

Under normal operating conditions, the bypass clutch is engaged as ratio changes take place from the full underdrive position. The clutch will be released when the vehicle is stopped.

In the closed loop diagram for the bypass clutch controller indicated in FIG. 18, the desired slip is compared to the actual measured slip at summing point 710. This results in an error signal that is distributed to a proportional-integral-derivative compensator of the kind well known in the control art. The PID controller is shown at 712 in FIG. 18. The compensated signal then is distributed through a zero order hold circuit 714 to the pulse width modulated solenoid valve 360, which controls the bypass clutch control valve 358 as previously described.

Engine speed and turbine speed are measured at 716 and 718. The engine speed sensor is diagrammatically represented in FIG. 18 at 720. Each speed signal is distributed through a first order digital filter circuit as shown at 722 and 724, respectively. The difference is detected at summing point 726. This represents the actual slip that is seen by the comparator 710.

The ratio control strategy, which is stored in ROM, actually comprises six different strategies depending upon the position of the range selector lever. In park and neutral range, the turning speed will be set to a fixed value. In the overdrive range, an economy turbine speed schedule will be followed. This will be described subsequently. In the drive range, a performance turbine speed schedule will be used. In the low range, a hill-breaking turbine speed schedule will be used. The schedules for overdrive range, drive range and low range are similar, although the calibration constants are different. Each of these schedules requires a turbine speed controller, which is schematically described in block diagram form in FIG. 19.

The desired turbine speed determination logic in the microprocessor 652 indicated in FIG. 19 receives the throttle position signal, the drive range selection signal, the primary sheave position signal, the oil temperature signal and a brake switch signal. The CPU in the processor 652 then computes a desired turbine speed and delivers it to a summing point or comparator 776. The value for the desired turbine speed is thus compared with the actual turbine speed delivered to the comparator through the signal flow path 778 shown in FIG. 19.

The difference between the desired turbine speed and the actual turbine speed is the speed error delivered to the controller CPU processor chip 780, which forms a part of the processor 652. The processor computes a duty cycle, taking into account the throttle position and the oil temperature.

After passing through a zero order hold and driver circuit 782, a signal is delivered through signal flow path 784 to the pulse width modulated solenoid and ratio control valves 364/362. Oil is delivered to the primary sheave and the secondary sheave thereby establishing a drive ratio for the variable ratio chain 150. Signals from the engine speed sensor 720, the turbine speed sensor 662 and the output speed sensor 668 then are delivered through their respective signal flow paths to the desired turbine speed determination logic circuit 652.

Engine/Transmission Matching

For every driving condition demanded by the operator, there will be a unique power demand on the engine. There is an optimal engine speed, an optimal torque, an optimal spark advance, optimal air/fuel ratio, and optimal exhaust gas recirculation valve flow rate to minimize fuel consumption while meeting specified exhaust emission constraints. For a given engine calibration, a unique throttle angle exists at all speed and load conditions that constitute the trajectory from idle to maximum power. This is illustrated in the engine map with constant horsepower lines shown in FIG. 5 and in the engine map with constant throttle lines shown in FIG. 6.

Figure 5:
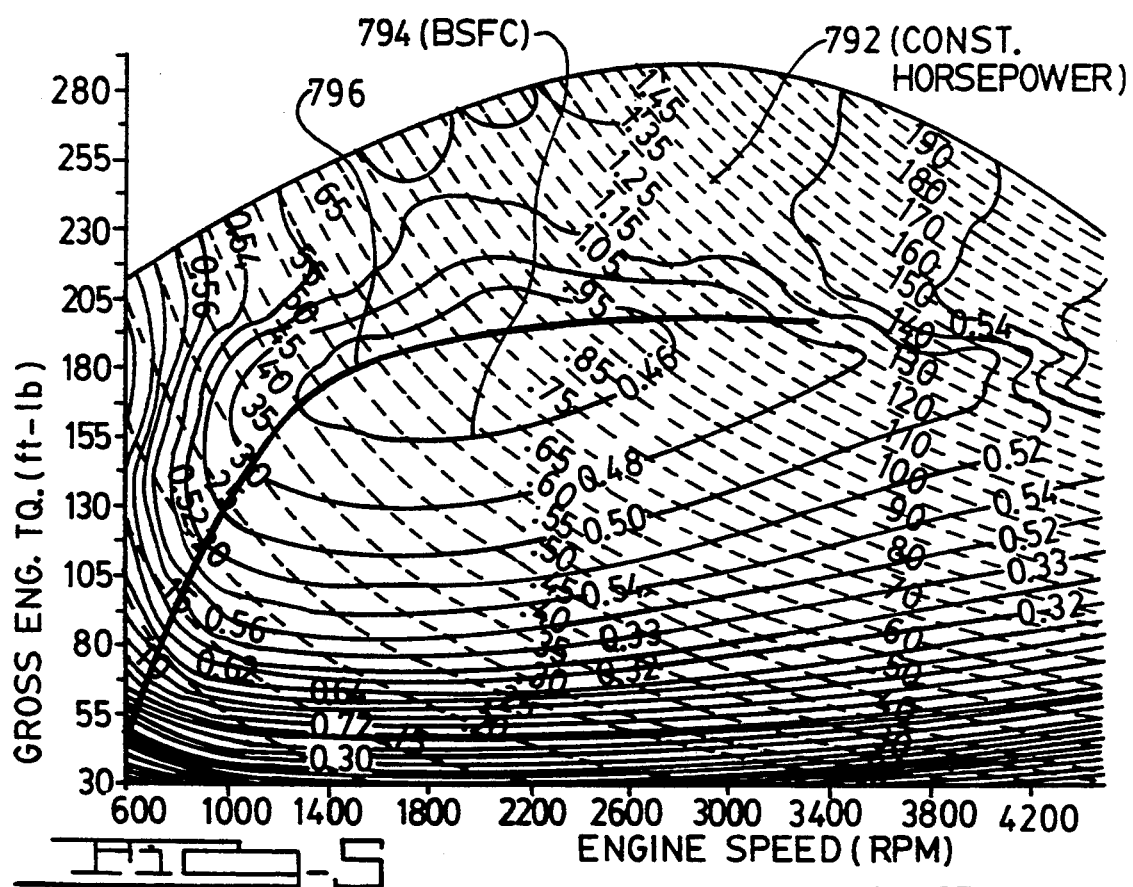
FIG. 5 is a plot of the gross engine torque versus engine speed illustrating the functional relationship that will result in minimum brake specific fuel consumption.
Figure 6:
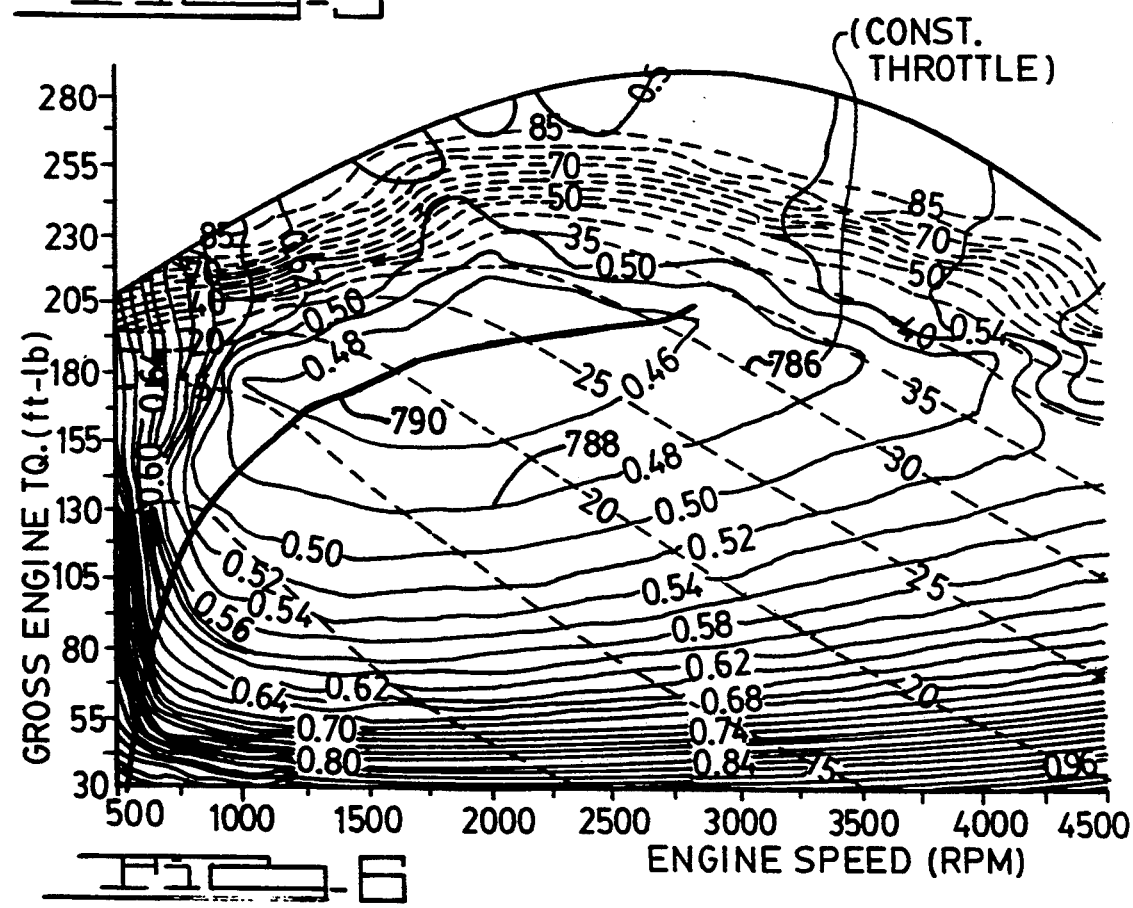
FIG. 6 is a plot similar to FIG. 5, but superimposed on FIG. 6 are constant throttle position lines as distinct from constant horse power lines shown in FIG. 5.

In FIGS. 5 and 6, gross engine torque is plotted on the ordinate and engine speed is plotted on the abscissa. The brake specific fuel consumption lines are plotted on each map. Constant throttle lines 786 show the relationship between engine speed and gross engine torque for each throttle setting.

The engine map of FIG. 5 is similar to that of FIG. 6. The plot of FIG. 5, however, is made showing constant horsepower lines 792 wherein the plot of FIG. 6 has constant throttle setting lines. Throttle setting is the driver input. As in the case of FIG. 6, superimposed on the map of FIG. 5 is a family of brake specific fuel consumption lines 794. For each engine speed and torque, as in the case of FIG. 6, there will be an ideal condition represented by the minimum brake specific fuel consumption line 796. For each throttle setting-and for each value of torque and speed, there will be a constant brake specific fuel consumption line. These lines are represented as a family, one of which is indicated by reference numeral 788. The ideal operating line, which represents the minimum brake specific fuel consumption relationship for each engine speed and engine torque condition, is shown at 790.

Figure 4:
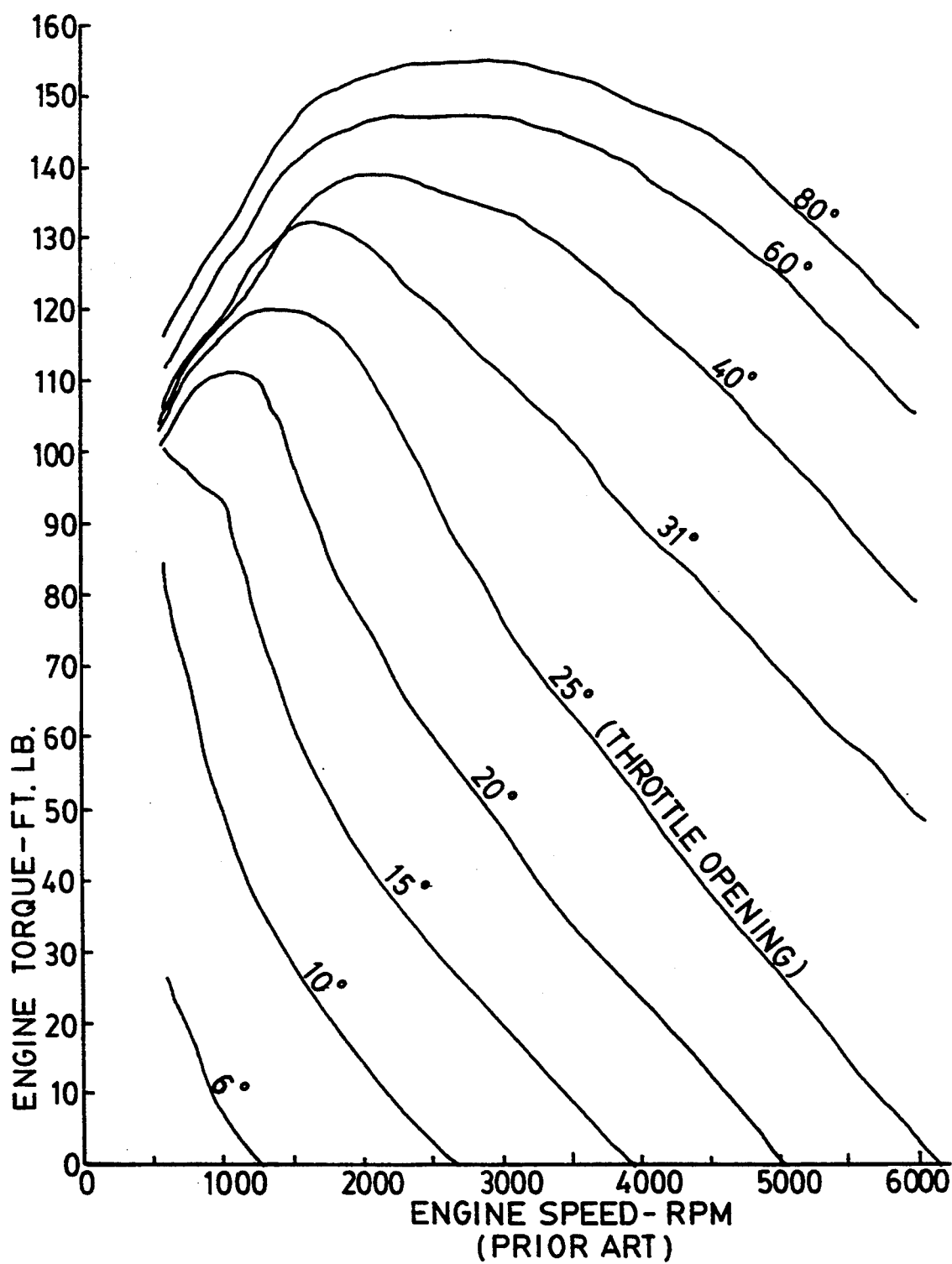
FIG. 4 is a plot of a typical internal combustion engine showing the relationship between engine speed and engine torque for various throttle settings.

FIG. 4 shows a typical internal combustion engine speed/torque relationship for various throttle angles.

Compromises to the ideal engine operating condition described with reference to FIGS. 5 and 6 must be made in order to meet driveability goals. A lower limit on the turbine speed must be imposed because of driveline vibration and noise problems that would occur if the engine speed should fall below a desired level for any given torque.

Control Strategy Overview

The electronic control system logic requires closed loop feedback control. For this purpose, simple proportional integral differential compensators are used. With a PID compensator, the integral term is multiplied by the software loop time. The differential term is divided by the loop time. The loop time remains constant in order to avoid variations in the gain of the closed loop system. This avoids control system instability.

The duty cycle signals for the three pulse width modulated solenoids and the single VFS solenoid must be updated at a rate equal to an integer multiple of the software loop frequency. The loop time must be long enough to complete all of the required algorithms.

The logic requires a continual monitoring of the input signals and the actions that are commanded. The input signals are checked for valid values. The action of the actuators will be monitored through the sensors. If a certain event is commanded and the command does not result in a change within a certain amount of time, a warning flag will be called out so a corrective action can take place.

Parameters that are stored include the minimum chain ratio, the maximum chain ratio, minimum and maximum pump displacement, minimum and maximum throttle position and duty cycle for a steady state ratio.

In the case of the input processing strategy, the analog inputs are sampled prior to a fetching of the transmission control algorithm. The signals are converted from analog to digital engineering values. The digital inputs are updated on an interim basis. Each input signal passes through a digital rolling average first order filter, as explained previously with reference to FIG. 16.

In FIG. 20, there is shown an overview of the various strategies contained in control modules that are successively activated during each background pass of the microprocessor. Various input sensor testing is done in the input sensor strategy action block 900 shown in FIG. 20. Following the action taken at action block 900, the line pressure is monitored and appropriate adjustments are made in the line pressure control strategy at action block 902. The ratio strategy then is carried out at action block 904. This will be explained subsequently in detail with reference to FIGS. 24A through 27B. After completion of the ratio strategy, the routine will proceed as indicated in FIG. 20 to action block 906 where the bypass clutch control strategy is carried out. This also will be explained with reference to FIGS. 24A through 27B.

The remaining part of the control strategy overview of FIG. 20 includes the clutch engagement strategy at action block 906 and the transmission lubrication control strategy at action block 908. When all of the strategies have been executed, the output actuator strategy indicated at 910 is carried out.

The ratio strategy mentioned briefly with respect to FIG. 20 is shown in detail in FIG. 21. The microprocessor will continuously monitor the input sensors and will calculate the parameters that will be required to effect the ratio strategy. This occurs at action block 912. The parameters themselves will be described in detail with reference FIGS. 24A through 27B.

The ideal primary speed then is established at the next action block 914. This is done with reference to the information stored in ROM relating to the optimum engine operating conditions described with reference to FIGS. 5 and 6. After that information is stored in ROM for each background pass, the processor proceeds to action block 916 where the temporary desired primary sheave speed is set. It then is clipped to a value less than the ideal primary speed called for by the engine parameters of FIGS. 5 and 6. This is temporary condition that is called for at the initial stages of the vehicle driveaway mode. This occurs at action block 918. The corresponding ratio valve travel is clipped at action block 920 to achieve the condition called for at action block 918.

Gain amplifiers are set at action block 922. That is followed by the filtering of the target primary speed and the calculation of speed errors at action block 924 for the PID controller logic described previously with reference to FIG. 3C. The PID controller logic is carried out at action block 926. The ratio solenoid duty cycle that is necessary to achieve the action taken at action block 926 is established at action block 928. The input to the pulse-width modulated ratio control solenoid 364 is established at action block 928.

Figure 22:
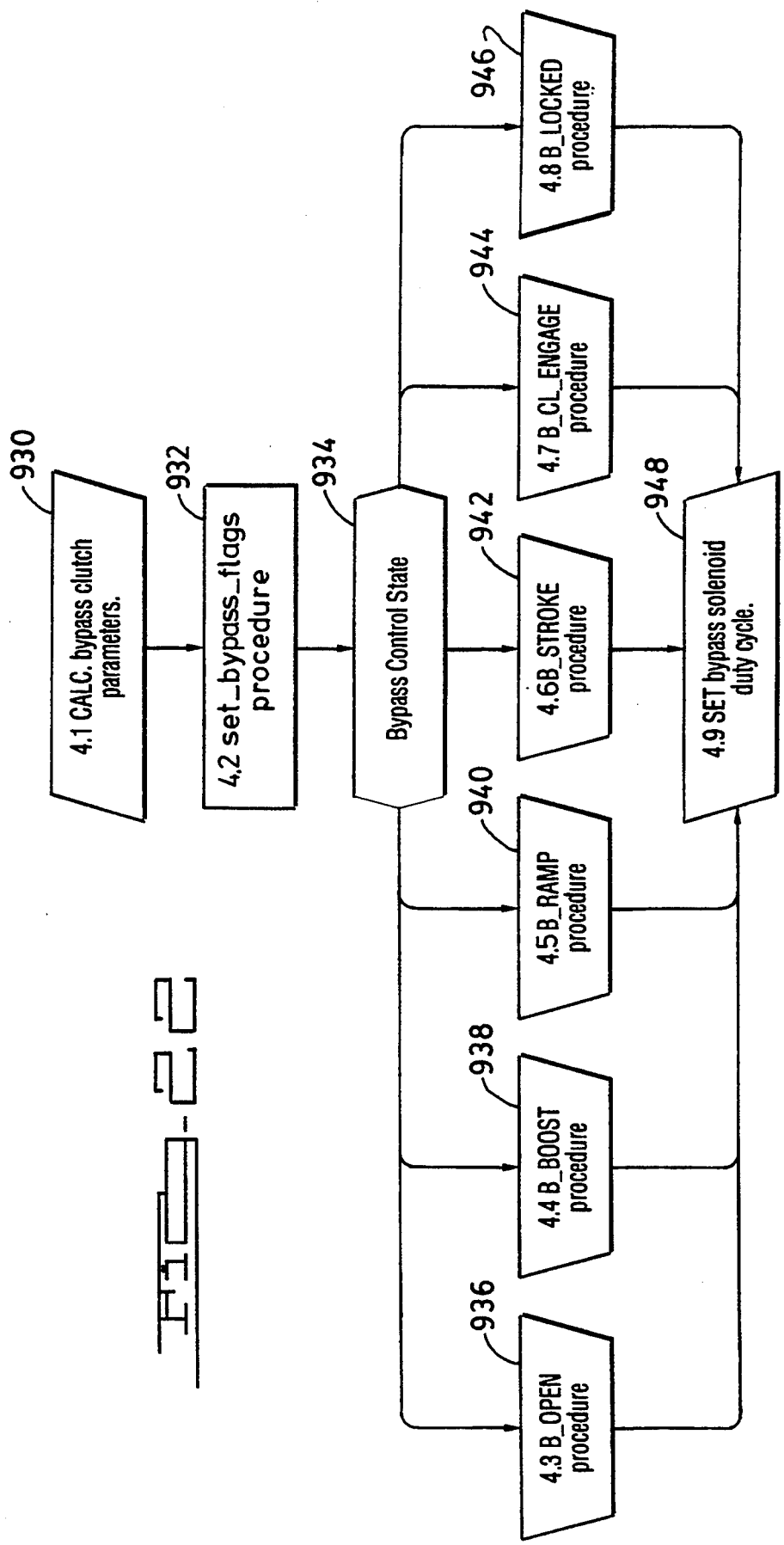
FIG. 22 is a flow diagram showing the bypass clutch strategy for the module illustrated in FIG. 20.

The bypass clutch strategy indicated at 906 in FIG. 20 is shown in detail in FIG. 22. At action block 930 of FIG. 22, the bypass clutch control parameters, which will be described subsequently with reference to FIGS. 24A through 27B, are calculated. The bypass clutch control flags are set at 932 and the routine proceeds to action block 934 where a determination is made as to the state of the bypass clutch. The duty cycle that is appropriate for the controlled bypass clutch depends upon the state that exits at any instant. The first state is the open converter state indicated at 936. The next state is the pressure boost control state prior to the time the actual clutch engagement routine begins. This is indicated at action block 938. The next bypass control state is the stroke stage at 942, followed by the ramp stage at 940. Upon completion of the stroke stage and prior to a full lockup condition, the bypass clutch is engaged as the pressure is ramped up, as indicated at action block 944 during closed loop control. This is followed by the fully locked up operating mode indicated at 946. Depending upon the state of the bypass clutch, the bypass solenoid duty cycle is set at the appropriate value as indicated at 948.

Figure 23:
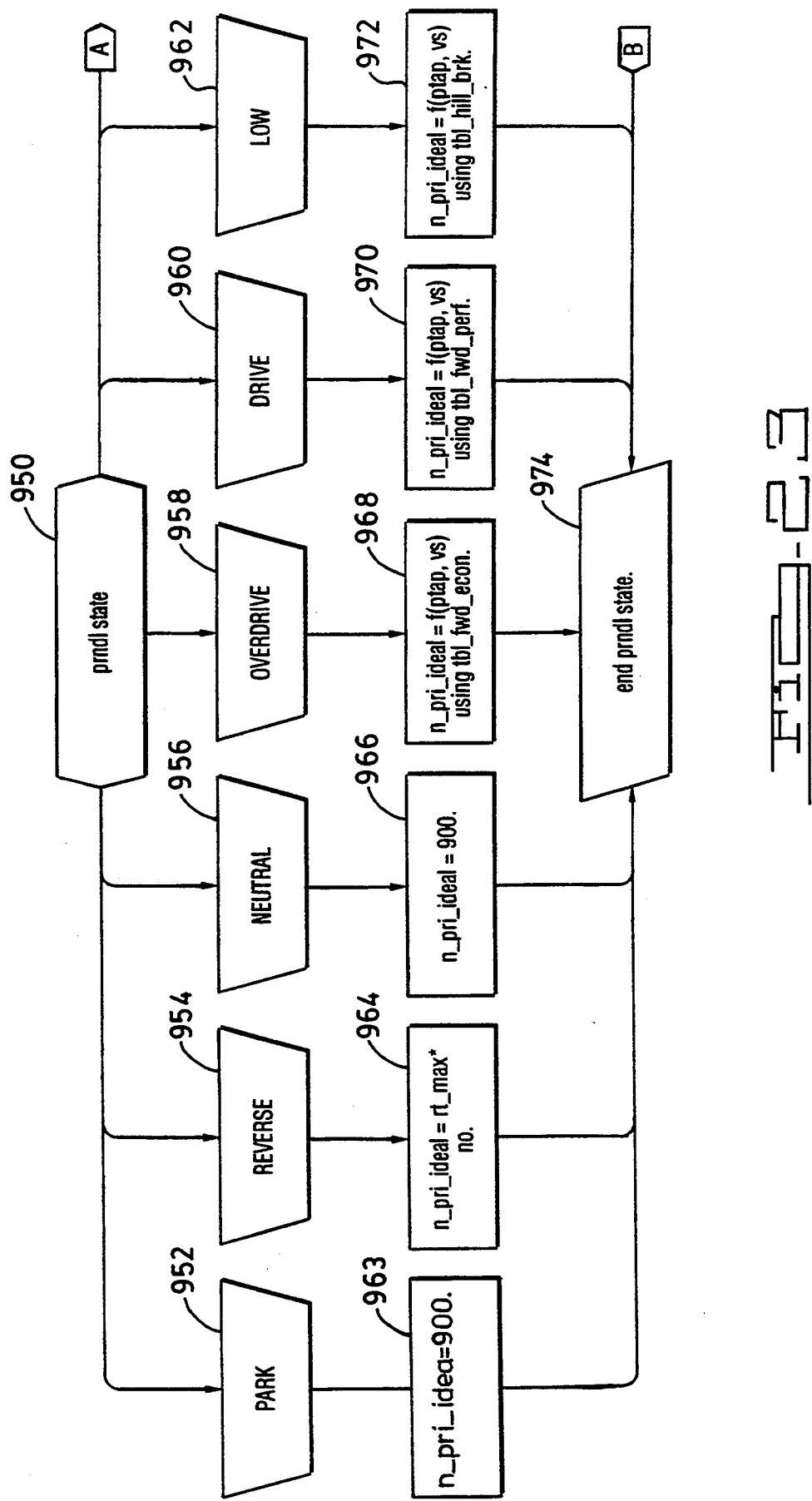
FIG. 23 shows a flow diagram illustrating the process steps for achieving the ideal primary speed, which is part of the sequence of FIG. 21.

The ideal primary speed is set in accordance with the strategy indicated in the flow diagram of FIG. 23. The ideal primary speed depends upon the PRNDL state or the position of the driver-controlled range selector. This is indicated at 950. For each of the possible positions of the range selector; i.e., PARK as shown at 952, REVERSE as shown at 954, NEUTRAL as shown at 956, OVERDRIVE as shown at 958, DRIVE range as shown at 960, and LOW range as shown at 962, there will be a separate ideal primary speed.

The ideal speed is calculated for each of the possible drive range selector positions. The calculated ideal primary speed for park is shown at action block 963. The calculation of the ideal primary speed for the reverse range is indicated at action block 964. The corresponding ideal primary speeds for the neutral, overdrive, drive and low ranges are shown at action blocks 966, 968, 970 and 972, respectively. The routine of FIG. 44 then exits as shown at 974.

Ratio and Bypass Clutch Strategy

For the purpose of comparing the improvements of my invention to a conventional continuously variable transmission with an open torque converter, I have shown in FIGS. 24A and 24B a plot of the relationship of engine speed, turbine speed and output speed to time during a driveaway operating mode and the corresponding relationship between throttle position and time.

Three separate vehicle driveaway conditions will be described; i.e., open converter, conventional converter and a coordinated converter.

Open Converter Driveaway

During the driveaway mode with an open converter, the engine speed, the turbine speed and the output shaft speed will vary over time as indicated in FIG. 24B. The corresponding throttle position change that is required during the interval indicated in FIG. 24B is shown in FIG. 24A. As the vehicle accelerates from a standing start, the turbine speed is limited to the underdrive ratio by the ratio controller.

FIG. 24A shows a minimum setting at 976 during the initial stage of the driveaway mode. This is when the engine is idling prior to acceleration from a standing start. At time 978, the throttle is advanced to an open setting 980. It remains at that setting during the driveaway operating mode.

The control system will respond to the change in setting of the throttle as indicated in FIG. 24B. The engine speed during the idle mode is at the value shown at 982. After advancement of the throttle as shown at 980, the engine speed increases rapidly as shown at 984 until it reaches a start-up value as shown at 986. The turbine speed corresponding to the engine speed shown at 986 is indicated at 988.

At the beginning of the driveaway mode, the speed sensors initially do not produce a valid speed measurement. This is indicated in the operating zone described in FIG. 24B as "Driveaway Without Speed Sensors". After an initial interval has passed, the speed sensors become settled and produce valid speed measurements. This signals the beginning of the zone indicated in FIG. 24B by the legend "Driveaway With Speed Sensors." At that time, the ratio is controlled to a value slightly lower than the underdrive stop ratio. The point at which the speed ratio begins to control the turbine speed slightly off the underdrive stop is indicated in FIG. 24B by reference numeral 990.

The turbine speed is controlled by the PID controller shown in FIG. 19. As the vehicle drives away, the turbine speed is limited to the underdrive ratio. The turbine will change in accordance with the closed loop PID control until an ideal speed is achieved. The minimum brake specific fuel consumption operating condition for FIG. 24B is used as the desired turbine speed schedule.

As the vehicle continues to accelerate, it will approach a speed where the ratio will change to maintain a desired turbine speed. This is indicated in FIG. 24B by reference numeral 992. The engine speed (994) at that stage of the acceleration mode is higher than the turbine speed (992) as indicated in FIG. 24B. This is due to the slipping of the open torque converter. The output speed varies in a substantially linear fashion as shown at 996.

Driveaway With Conventional Converter Lockup

If the torque converter includes a lockup clutch, the speed characteristics are changed because the engine speed becomes equal to the turbine speed after the lockup clutch is fully engaged. This condition is shown in FIG. 25. The converter lockup strategy is controlled independently of the ratio control in the driveaway condition shown in FIG. 25. The turbine speed profile shown at 998 and 1000 in FIG. 25 is generally the same as the profile as shown at 988 and 992 in FIG. 24B. During the driveaway mode with the speed sensors active, the turbine speed is maintained just off the underdrive stop as in the case of FIG. 24B.

The engine speed in the case of a lockup converter transmission is indicated in FIG. 25 at 1002. This is similar to the engine speed characteristic shown at 986 and 994 in FIG. 24B. At time 1004, the lockup clutch begins to engage as the lockup clutch engagement is commanded. At this point, the engine speed converges, as shown at 1006, toward the turbine speed as the lockup clutch gains capacity. The lockup time in a working embodiment of the invention may be about 3 seconds. After the lockup is achieved at time 1008, engine speed and turbine speed are equal. Output speed is varied in this case by the independent ratio controller described with referenced to FIG. 3A.

When the torque converter is locked up, as shown in FIG. 25, the engine speed is the same as turbine speed.

The lockup time of 3 seconds is a design compromise between smoothness in the ratio change and clutch engagement on the one hand, and energy absorption considerations on the other hand. It has been observed that this compromise, notwithstanding the intended balancing of the smoothness considerations with the energy absorption considerations, results in a sensation similar to a ratio shift in a conventional automatic transmission. This produces an undesirable engine lugging sensation as the clutch becomes engaged during a power-on operating mode.

Driveaway With Coordinated Converter Lockup

The improvements of my invention overcomes this lack of shift smoothness upon engagement of the lockup clutch. This is demonstrated in FIGS. 26, 27A and 27B where I have plotted engine speed, turbine speed and output speed versus time during driveaway.

In FIG. 26, the engine speed is at an idle value, as shown at 1010, at a time less than Time No. 1. No torque is being delivered by the engine at this time. The turbine speed control adjusts the chain ratio at full underdrive and the converter bypass control unlocks the bypass clutch.

Between Time No. 1 and Time No. 2 in the chart of FIG. 26, the vehicle operator advances the engine throttle, causing a rapid rise in engine speed as shown at 1012. The torque converter, which is open at this time, is in its stall condition and the engine speed increases to its max value as shown at 1014, which is the converter stall speed. After the vehicle begins to move, a reliable speed signal is developed as indicated at 1016.

The speed/time relationships of FIGS. 24B and 25 between Time No. 1 and Time No. 3 are the same as the corresponding relationships between Time No. 1 and Time No. 3 shown in FIGS. 26, 27A and 27B.

The speed sensors at the start of the interval between Time No. 1 and No. 2 are not capable of developing a reliable signal, so the PID turbine speed controller is not then operative. Also, the chain ratio setting remains at the full underdrive ratio. The bypass clutch, of course, remains unlocked.

Between Time No. 2 and No. 3 in the chart of FIG. 26, the speed sensor signals are reliable, thus permitting the turbine speed control and the bypass clutch control to become effective. The processor will retrieve from a look-up table in memory a value for the ideal turbine speed, which is indicated by the horizontal line 1018 in FIG. 26. For each background pass, an ideal value for the turbine speed is achieved as a function of the selector lever position, the throttle angle and the vehicle speed. That is, ideal turbine speed is expressed as:

$$n\_pri\_ideal = f(prndl, ptap, vs)$$

The desired or target turbine speed is determined by the closed loop controller of FIG. 19 and is represented at 1020 in FIG. 26. That target turbine speed, n_pri_target, equals measured output speed times the difference between maximum underdrive ratio of the chain minus the increment from the maximum underdrive. That is:

$$n\_pri\_target = n_o * (rt\_max - RT\_STOP\_OFF\_MAX)$$

The bypass clutch control will not be initiated until certain bypass control entry conditions are present. These conditions are the measured oil temperature of the transmission, the converter speed ratio and the vehicle speed. Each of those conditions must be greater than calibrated values. Thus:

$$tot > TOT\_LUP\_MIN,$$

$$turb\_rat > SR\_LUP\_MIN$$

$$vs > VS\_LUP\_MIN$$

The transmission oil temperature must be greater than a calibrated minimum, the converter speed ratio must be greater than the converter speed ratio required by the transmission calibrator for lockup to occur, and the vehicle speed must be greater than the vehicle speed required by the transmission calibrator for lockup.

Between Time No. 2 and Time No. 3 in the chart of FIG. 26, the entry conditions for the bypass clutch control are tested. The converter bypass clutch control is allowed to enter the stroke mode at this time with no torque transfer occurring across the bypass clutch.

During the time delay between Time No. 3 and Time No. 4, the ratio control causes the chain to move away from the underdrive stop. The turbine speed is controlled to the ideal value indicated by the dotted line 1018 as mentioned previously. That value equals:

$$n\_pri\_ideal = f(prndl, ptap, vs)$$

The ideal turbine speed and the desired target speed between Time No. 3 and Time No. 4 are the same. The bypass clutch control maintains the clutch in its stroked condition, but the clutch does not yet deliver torque.

At Time No. 4, the bypass clutch slip speed is ramped downward. This causes engine speed to ramp down as indicated at 1022. The slope of the line 1022 is a value recalled from the ROM portion of the memory of the processor and is equal to ne_byp_ramp_rate. The time interval between Time No. 4 and Time No. 5 is indicated in FIG. 27A and 27B as the value T_BYP_SLIP.

The ramp line 1022 equals b_slip divided by T_BYP_SLIP. These values are indicated in FIG. 27A as well as in FIG. 26. Shown in FIG. 27A at 1023 is a plot of the slip of the converter versus time between Time No. 2 and Time No. 5. The is slip is decreasing as the desired target turbine speed, shown in FIG. 26 and in FIG. 27B, is increasing. This is indicated at 1024 in FIG. 27A.

In FIG. 27A, the ramping down of the slip between Time No. 4 and Time No. 5 is designated by the symbol n_pri_slip. The ramped engine speed line shown in FIG. 26 is shown also in FIG. 27A and carries the legend n_byp_slip_rate. The turbine slip controller acts to maintain the engine speed so that it decreases generally in conformance with the line ne_byp_ramp_rate. The function of the turbine speed controller is separately illustrated in companion curve of FIG. 27B. Between the Time No. 4 and Time 5, the desired target speed is higher than the ideal speed and the difference between these values at any time between Time No. 4 and Time No. 5 is equal to the quantity n_pri_byp_eng_inc.

The turbine speed during the ramping down of the engine speed between Time No. 4 and Time No. 5 is indicated in FIGS. 26 and 27B by the symbol 1024.

At point 1026 in FIG. 26, the desired target turbine speed becomes equal to engine speed. The difference between the ramped engine speed and the ideal speed at that time is equal to the value ne_byp_inc, as indicated in FIG. 26.

A summary of the equations for determining ramped engine speed, the desired target speed using turbine speed control and converter bypass control is summarized as follows:

Interval T4–T5

Conditions

After fixed delay time is up, the following calculations are done:
b_slip = slip
ne_byp_ramp_rate = b_slip/T_BYP_NE_RAMP
n_byp_slip_rate = b_slip/T_BYP_SLIP
Turbine Speed Control
n_pri_ideal = f(prndl, ptap, vs)
n_pri_target = n_pri_ideal + n_pri_byp_eng_inc
Converter Bypass Control
ne_byp_inc = b + slip − (ne_byp_ramp_rate * (t − T4))
n_byp_slip = b_slip − (n_byp_slip_rate * (t − T4))
n_pri_byp_eng_inc = ne_byp_inc − n_byp_slip

Interval T5–T6

Between Time No. 5 and Time 6 in the curves of FIGS. 26 and 27B, the turbine speed continues to be controlled in the same fashion described above for the time interval between Time No. 4 and Time No. 5. Thus, the converter bypass control can be set to its maximum torque transmitting capacity and the ratio controller will function in a manner similar to the function of the ratio controller between Time No. 4 and Time No. 5. This is represented by the following equations:

Conditions
Period started when n_byp_slip = 0
Turbine Speed Control
n_pri_ideal = f(prndl, ptap, vs)
n_pri_target = n_pri_ideal + n_pri_byp_eng_inc
Converter Bypass Control
Bypass clutch set to maximum torque capacity
ne_byp_inc = b_slip − (ne_byp_ramp_rate * (t − T4))
n_pri_byp_eng_inc = ne_byp_inc.

After Time No. 6 is reached in the curves of FIGS. 26 and 27B, the quantity ne_byp_inc = 0 since the engine speed will have reached its ideal speed at that point. The turbine speed, obviously, will also be equal to the ideal speed n_pri_ideal. The bypass clutch continues to be operated at its maximum torque transmitting capacity.

The various parameters that are indicated in FIGS. 26, 27A and 27B and in the preceding text, together with their definitions, are listed in Table form as follows:

| PARAMETER | MEANING |
| --- | --- |
| prndl | Measured shift lever position (P, R, N, OD, D, L) |
| ptap | Measured throttle angle position in percent |
| vs | Vehicle speed, f(no) |
| $n_e$ | Measured engine speed |
| no | Measured transmission output shaft speed |
| rt_max | Maximum underdrive chain ratio |
| RT_STOP_OFF_MAX | Increment from maximum underdrive |
| tot | Measured trans. oil temperature |
| TOT_LUP_MIN | Trans. oil temp required for lockup |
| turb_rat | Converter speed ratio, n_turb / ne |
| SR_LUP_MIN | Converter speed ratio required for lockup |
| VS_LUP_MIN | Vehicle speed required for lockup |
| T-RAMP_1 | Time delay |
| slip | Converter slip, ne - n_turb |
| T_BYP_NE_RAMP | Time allotted to ramp down engine speed during lockup |
| T_BYP_SLIP | Time allotted to ramp down converter slip during lockup |

In the lockup strategy of FIG. 26, the engine speed will converge toward the turbine speed over a period of about 3 seconds, but the time for engine speed drop is doubled from 3 seconds to 6 seconds. The lockup occurs over the same period of 3 seconds as in the case of the lockup control of FIG. 25, but the engine lag or inertia change due to the change in engine speed is not nearly as noticeable as in the case of the controller of FIG. 25. Also, the energy absorbed by the bypass clutch of FIG. 26 is approximately half of that of FIG. 25 due to the smaller engine speed change.

The slip time in the case of the strategy of FIG. 26 is accomplished by commanding a turbine speed that is the difference between the desired engine speed profile and the desired slip profile of the torque converter. As the desired or target 10 turbine speed rises to meet the ramped engine speed curve at Time No. 5, the turbine speed and the engine speed are lowered together along the engine speed ramp line ne_byp_ramp_rate until the ideal engine speed line 1018 has reached.

Having described a preferred embodiment of my invention, what I claim and desire to secure by U.S. Letters Patent is:

1. An infinitely variable transmission for a vehicle adapted to deliver torque from a throttle-controlled internal combustion engine to vehicle traction wheels, comprising
a variable ratio torque transfer drive including a driving member and a driven member defining in part a torque flow path from said engine to said traction wheels;
a hydrokinetic torque converter in said torque flow path between said engine and said torque transfer members, said converter having an impeller driven by said engine and a turbine connected drivably to said driving member;
a converter lockup friction clutch adapted to connect said impeller and said turbine thus bypassing said converter;
engine speed sensor means for detecting instantaneous engine speed, turbine speed sensor means for detecting instantaneous turbine speed, and output speed sensor means for detecting vehicle speed;
means for controlling turbine speed at the beginning of acceleration of said vehicle to achieve a target turbine speed and a ratio control that will result in an engine speed within a first engine speed range;
means for determining an ideal engine speed in a range lower than said first engine speed range to achieve minimum brake specific fuel consumption for each throttle setting;
means for ramping down engine speed to a value near said ideal engine speed over a first period of time including a closed loop turbine speed control; and
means for engaging said lockup clutch during a second period of time shorter than said first period of time including a closed loop converter slip control whereby said lockup clutch becomes engaged with reduced energy absorption as said engine speed is ramped down to achieve said ideal engine speed with increased smoothness.

2. The combination as set forth in claim 1 wherein said means for determining ideal engine speed comprises engine throttle position sensing means and means for comparing instantaneous throttle position to known functional relationships between throttle settings and engine speed consistent with minimum brake specific fuel consumption to obtain said ideal engine speed.

3. The combination as set forth in claim 1 wherein said means for ramping down engine speed includes logic means for determining desired turbine speed as a function of said turbine speed, said vehicle speed and said engine speed for each of said instantaneous throttle settings, means for comparing said desired turbine speed with said instantaneous turbine speed to detect a turbine speed error therebetween, said means for controlling turbine speed to achieve ratio control responding to said error in a closed loop manner.

4. The combination as set forth in claim 1 wherein said means for engaging said lockup clutch comprises logic means for determining instantaneous desired slip as a function of engine throttle position, engine speed and vehicle speed, means for comparing said instantaneous engine speed and said instantaneous turbine speed to detect actual slip, means for comparing actual slip to desired slip to detect slip error therebetween, said means for engaging said lockup clutch to achieve converter slip control responding to said slip error in a closed loop manner.

5. The combination as set forth in claim 3 wherein said means for engaging said lockup clutch comprises logic means for determining instantaneous desired slip as a function of engine throttle position, engine speed and vehicle speed, means for comparing said instantaneous engine speed and said instantaneous turbine speed to detect actual slip, means for comparing actual slip to desired slip to detect slip error therebetween, said means for engaging said lockup clutch to achieve converter slip control responding to said slip error in a closed loop manner.

6. The combination as set forth in claim 1 wherein said variable ratio torque transfer drive comprises a driving sheave assembly and a driven sheave assembly, a continuous belt drivably connecting said sheave assemblies, said turbine being connected drivably to said driving sheave assembly, said means for controlling turbine speed comprising means responsive to ratio changing movement of said driving sheave assembly as said engine speed is ramping down toward said ideal engine speed.

7. The combination as set forth in claim 4 wherein said variable ratio torque transfer drive comprises a driving sheave assembly and a driven sheave assembly, a continuous belt drivably connecting said sheave assemblies, said turbine being connected drivably to said driving sheave assembly, said means for controlling turbine speed comprising means responsive to ratio changing movement of said driving sheave assembly during as said engine speed is ramping down toward said ideal engine speed.

* * * * *